C. BURNHAM.
BOX MACHINE.
APPLICATION FILED DEC. 26, 1908. RENEWED APR. 27, 1914.
1,119,343.
Patented Dec. 1, 1914.
21 SHEETS—SHEET 2.
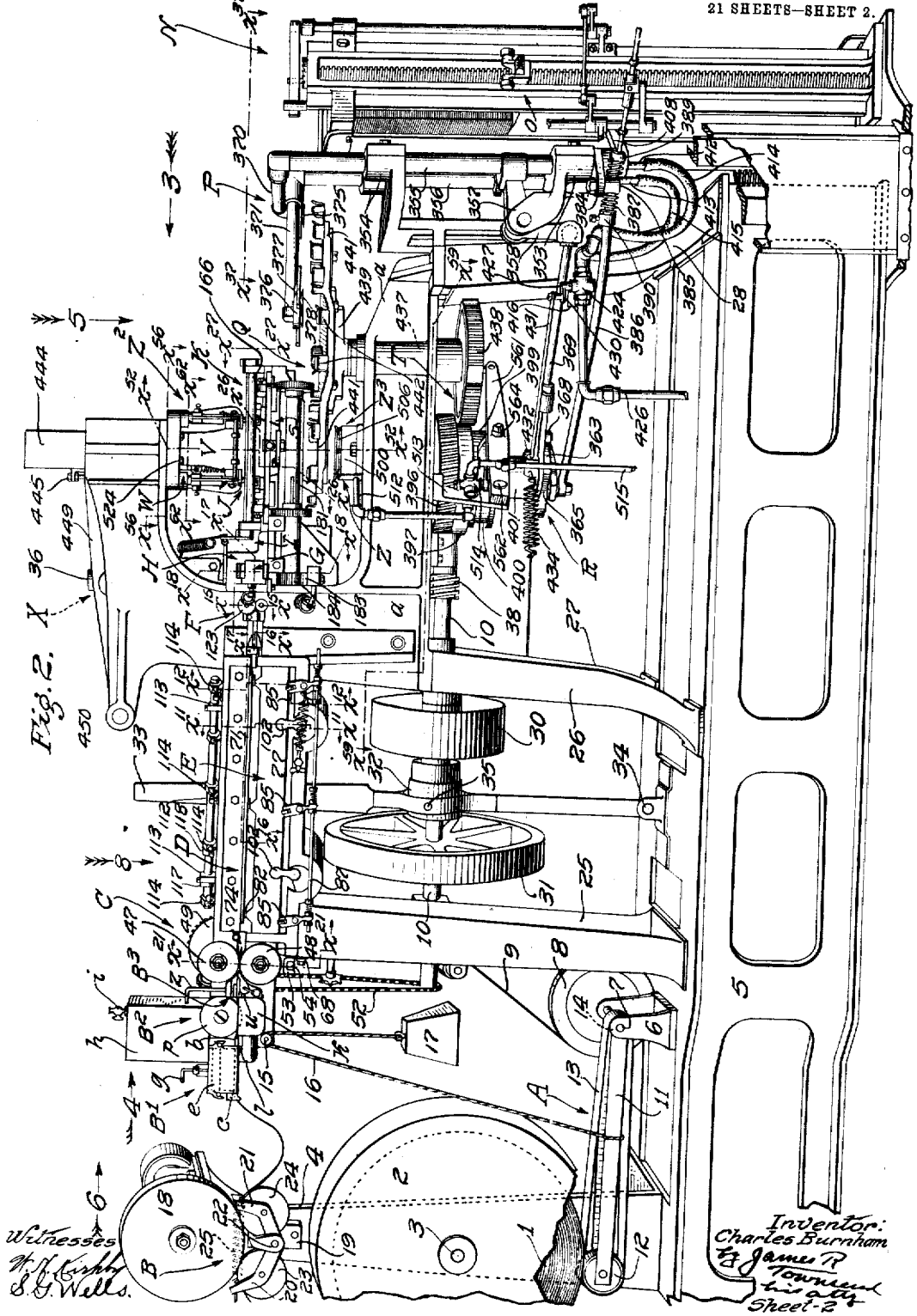

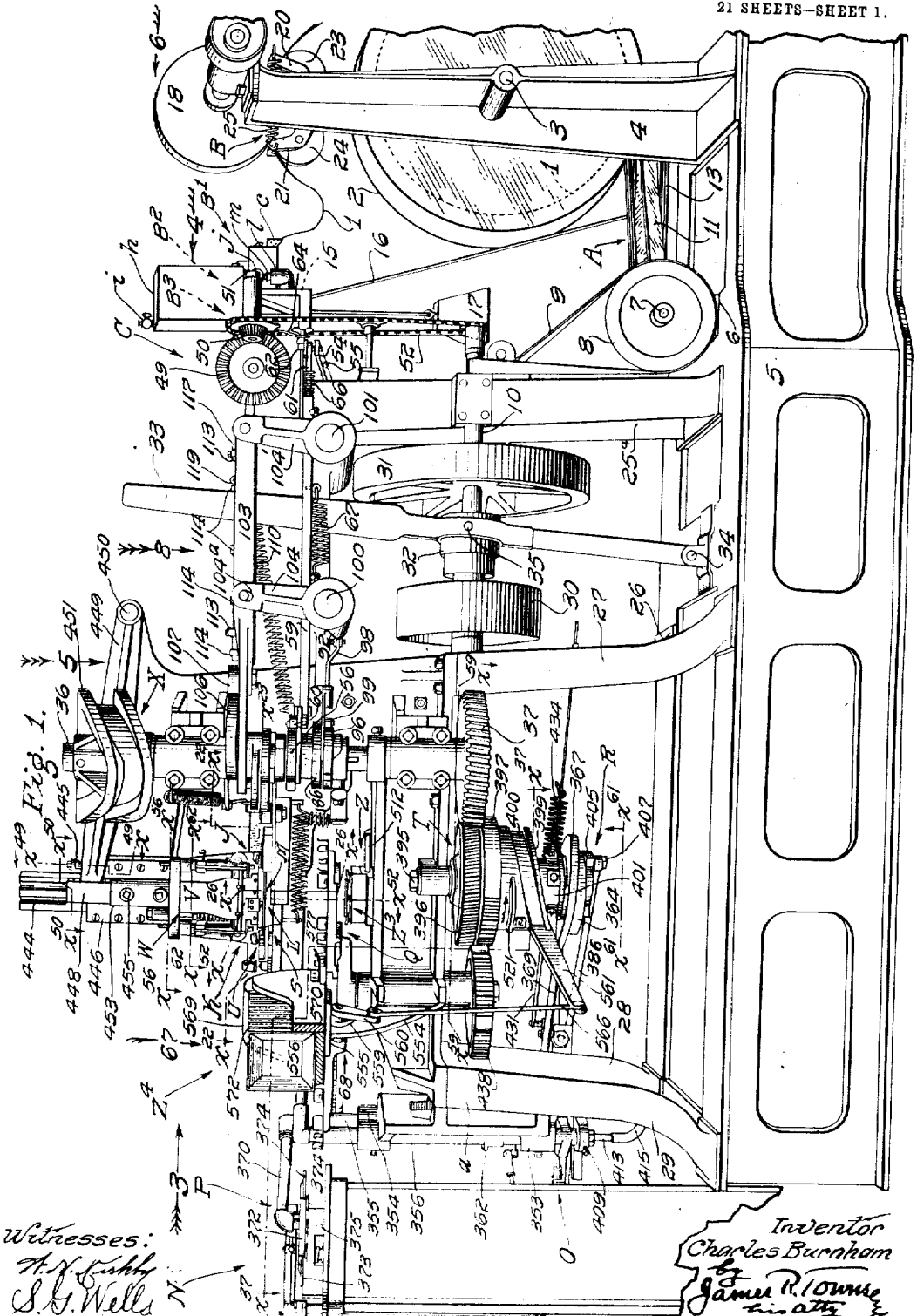

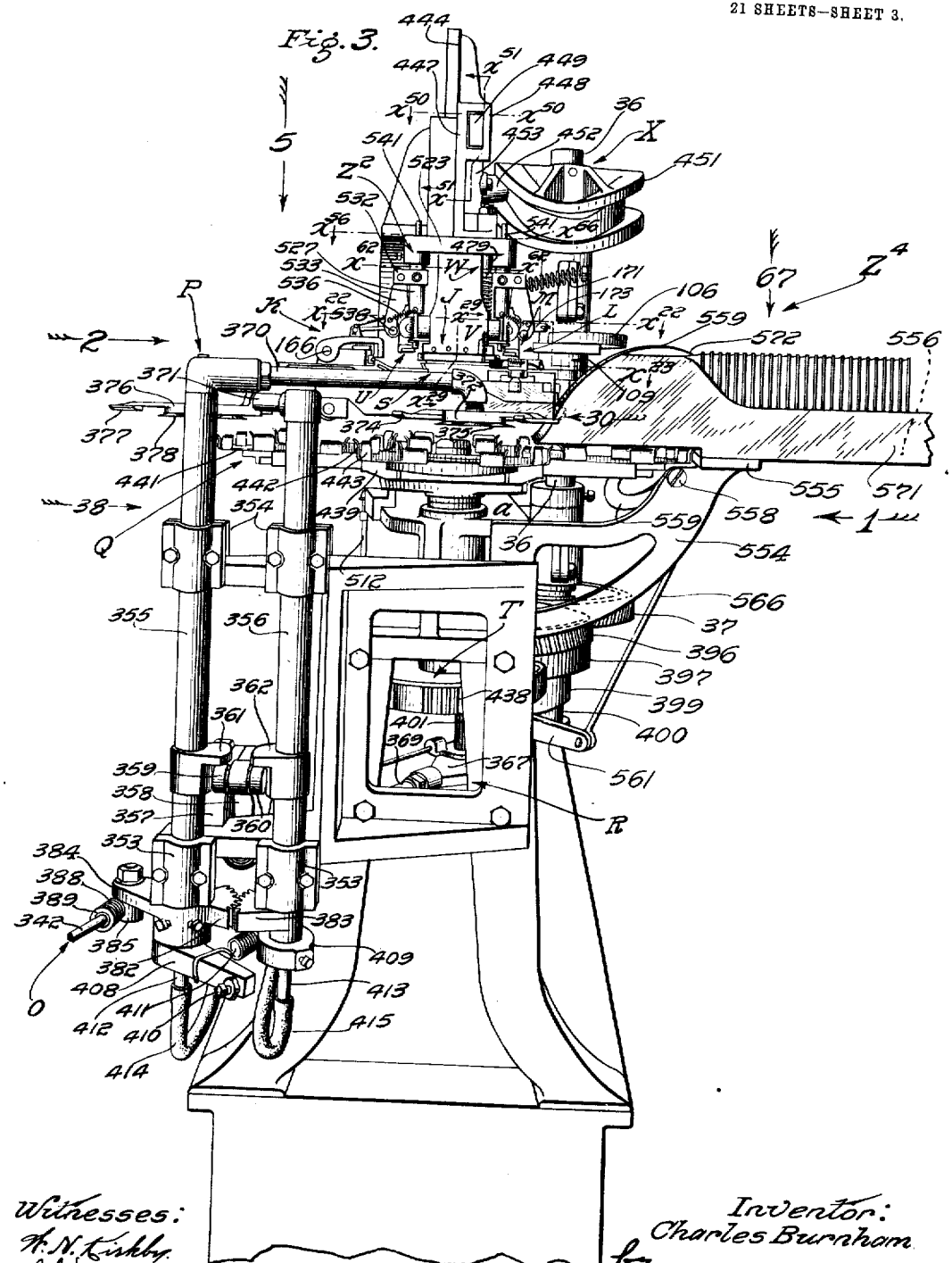

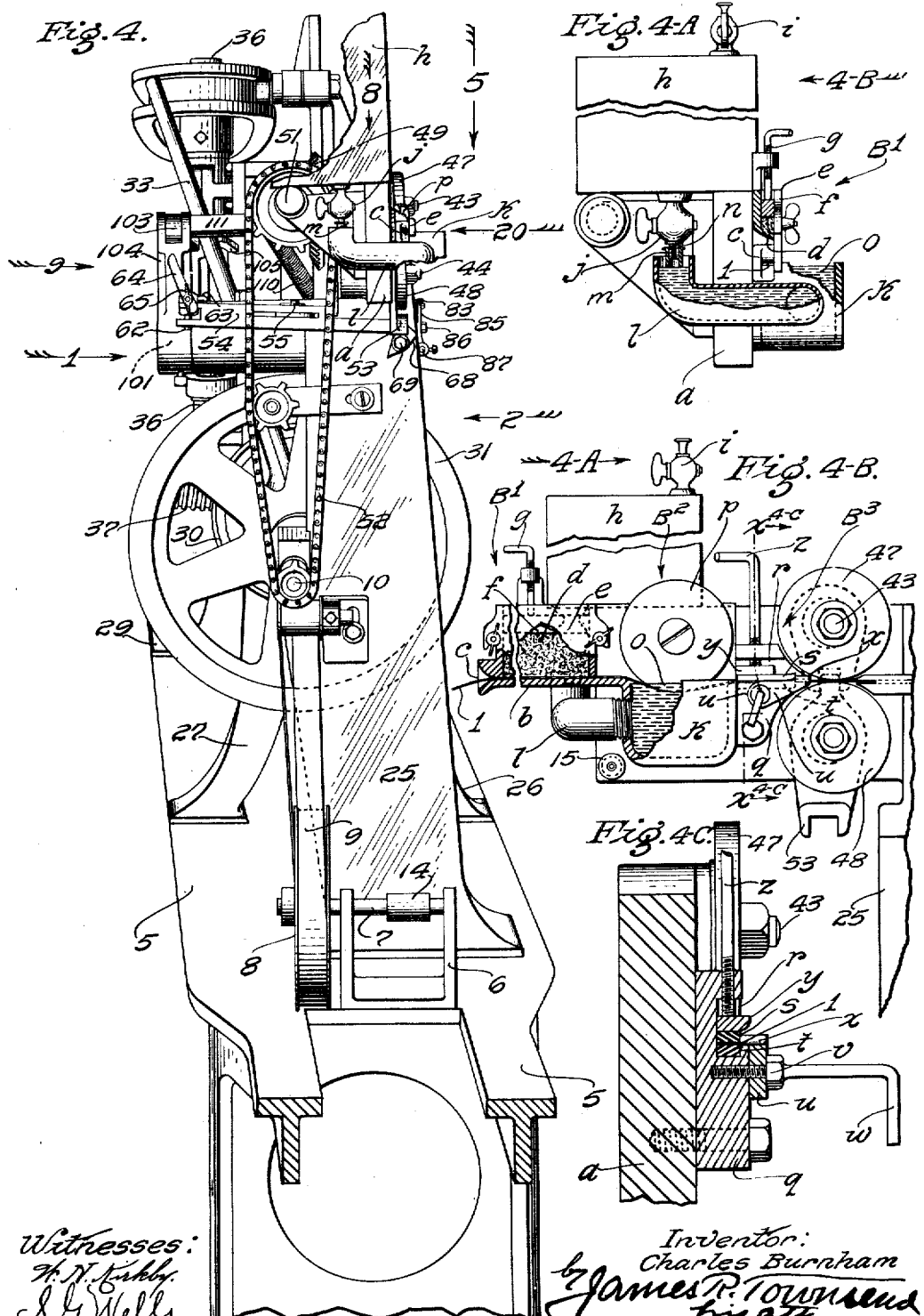

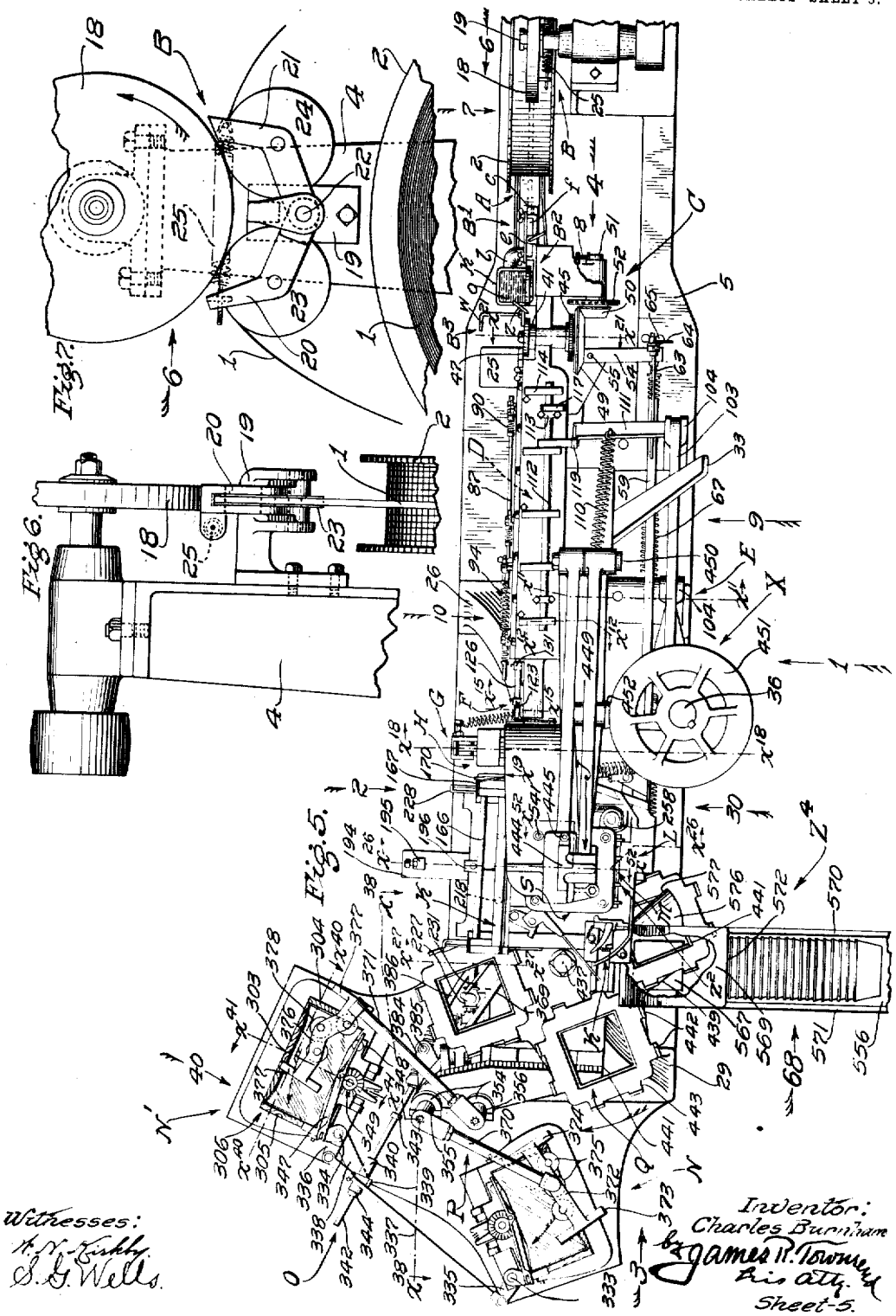

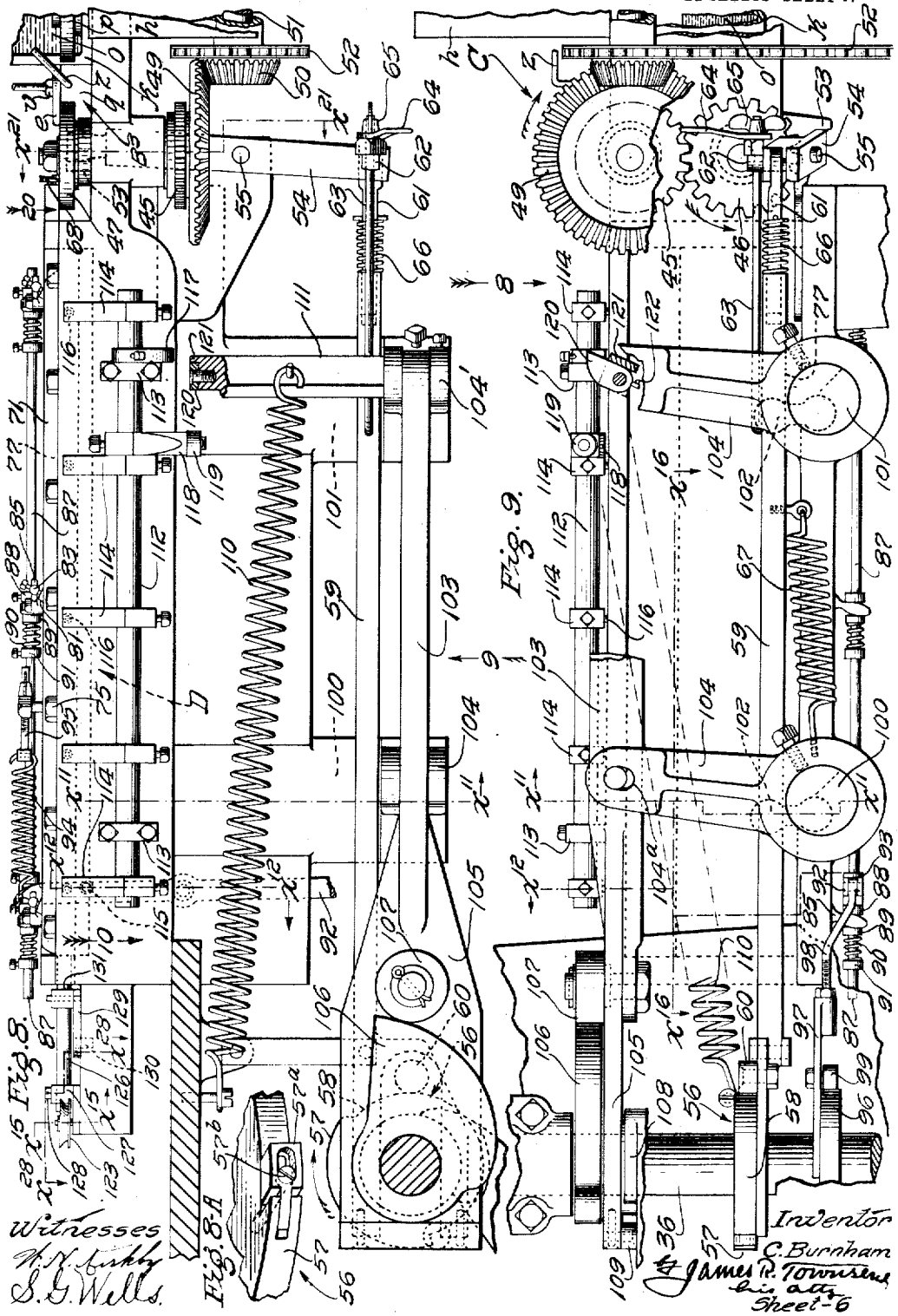

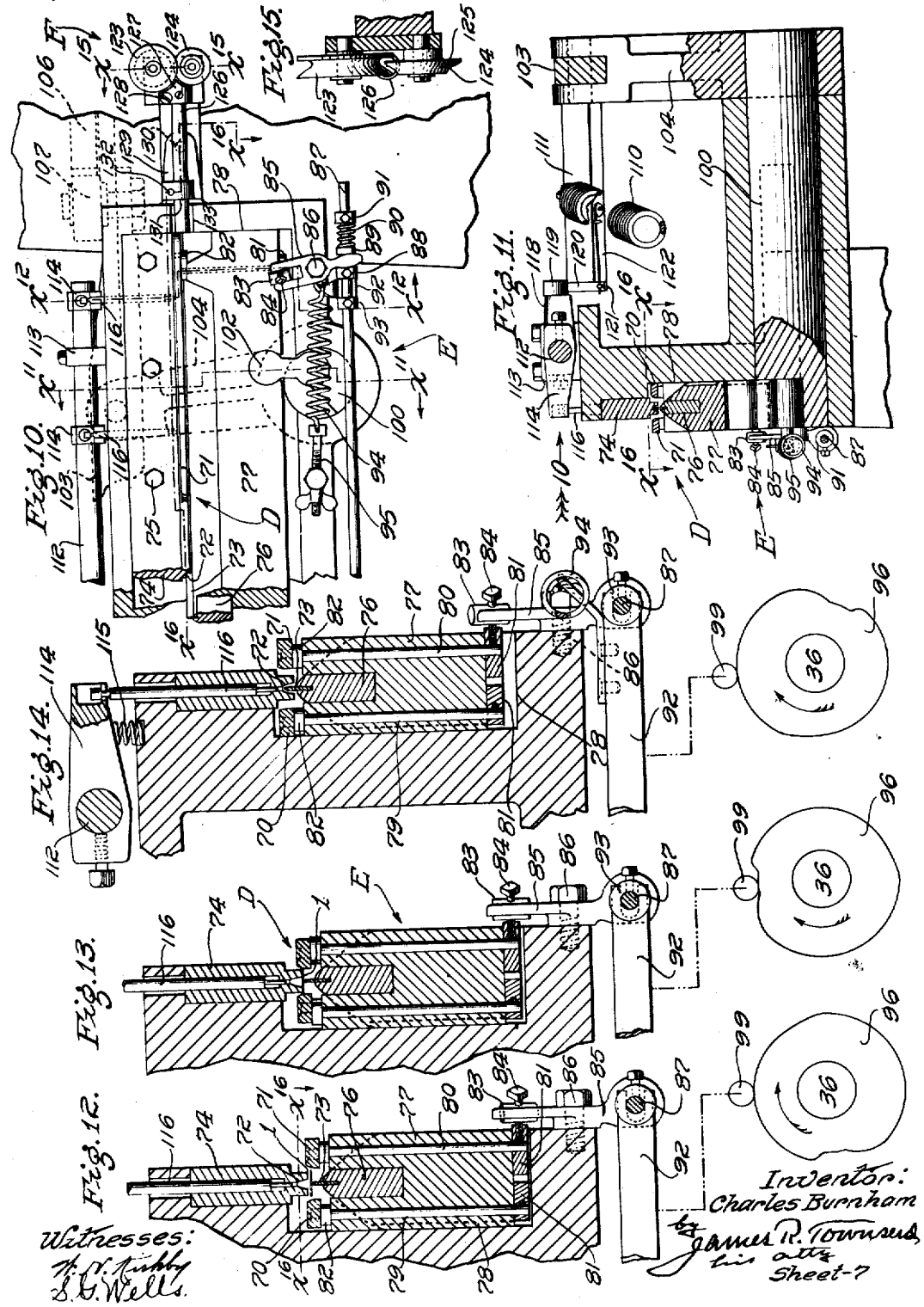

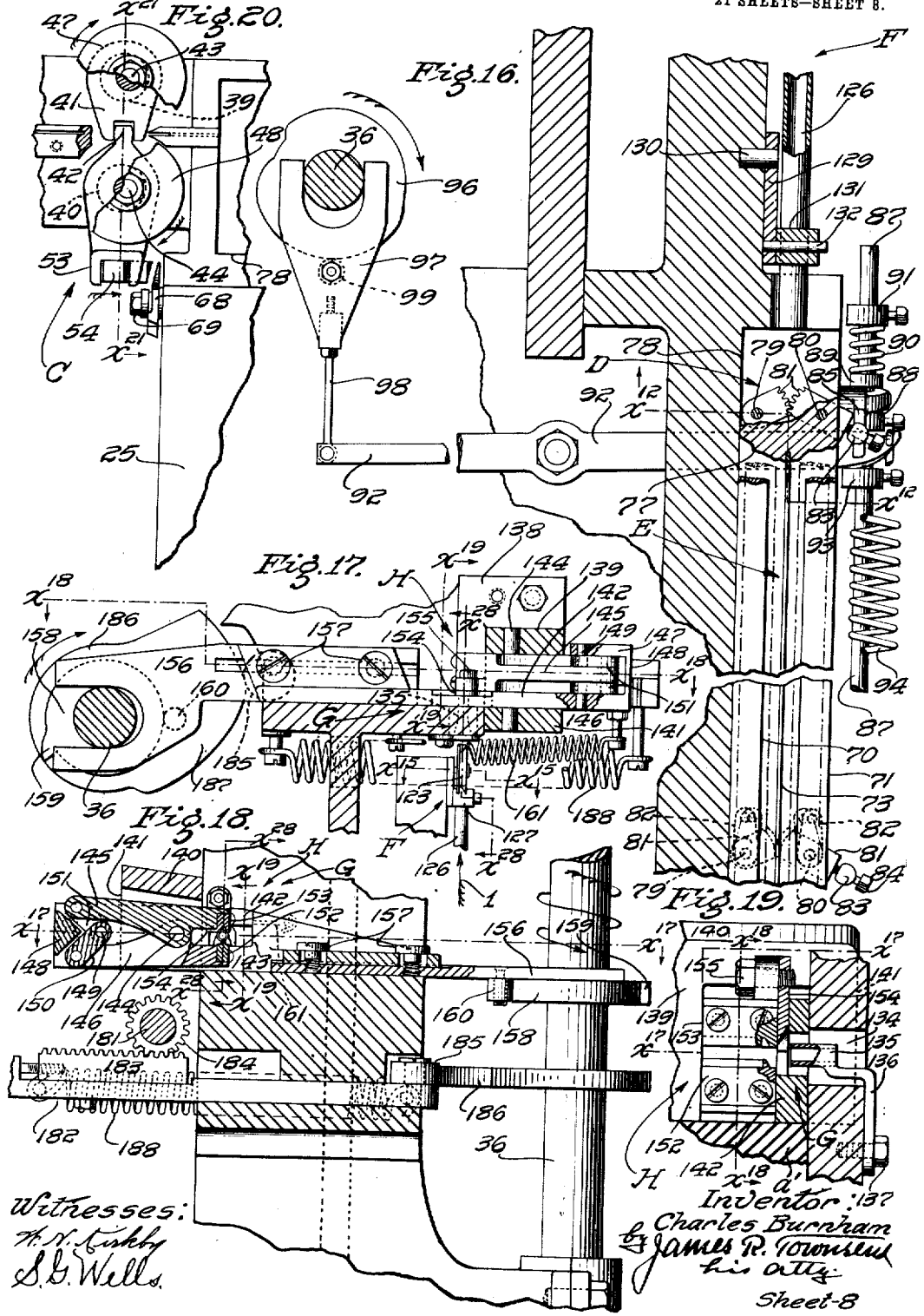

C. BURNHAM.
BOX MACHINE.
APPLICATION FILED DEC. 26, 1908. RENEWED APR. 27, 1914.
1,119,343.
Patented Dec. 1, 1914.
21 SHEETS—SHEET 9.
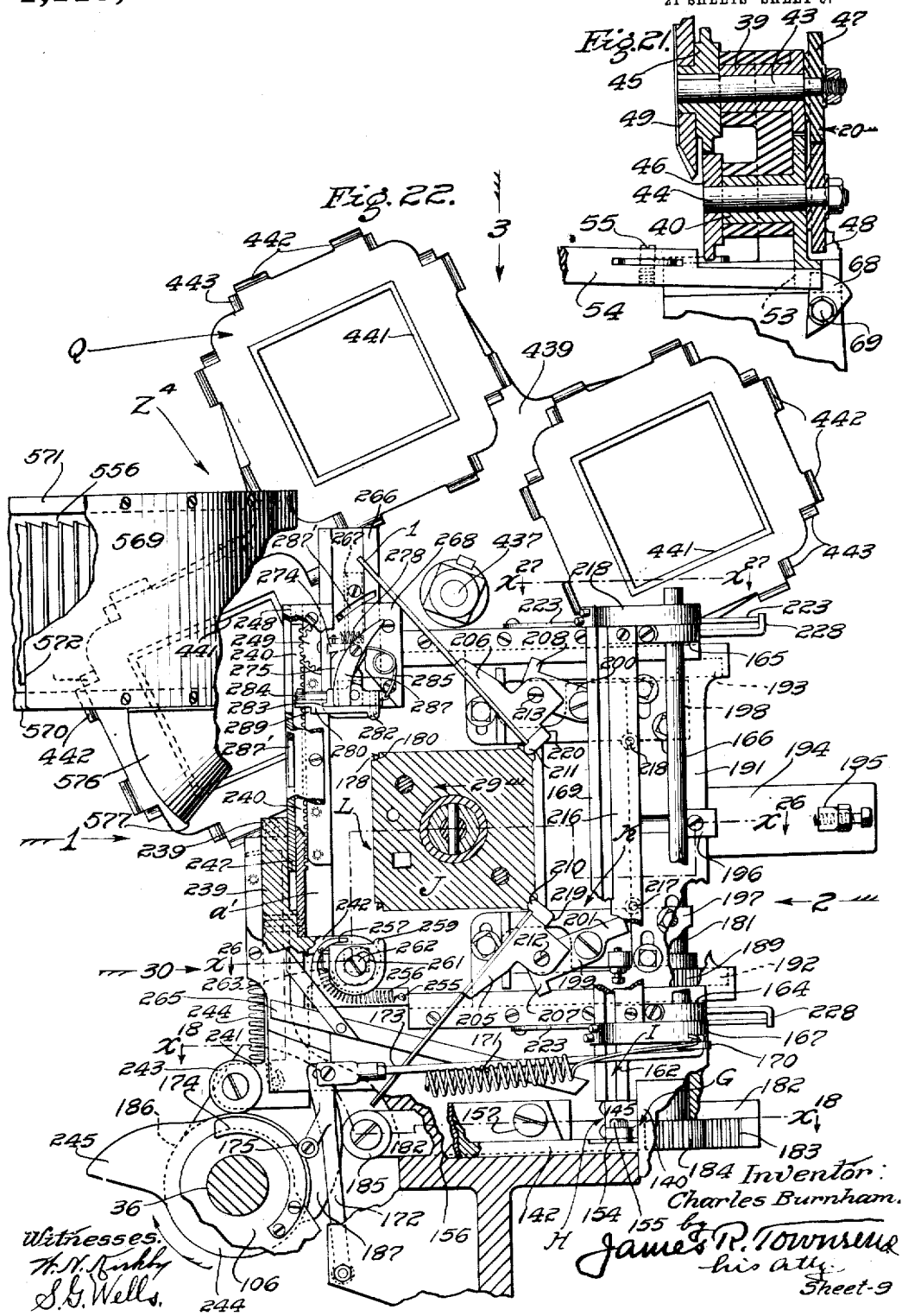
Witnesses.
H. N. Kirby
S. G. Wells
Inventor:
Charles Burnham.
by James R. Townsend
his atty
Sheet-9

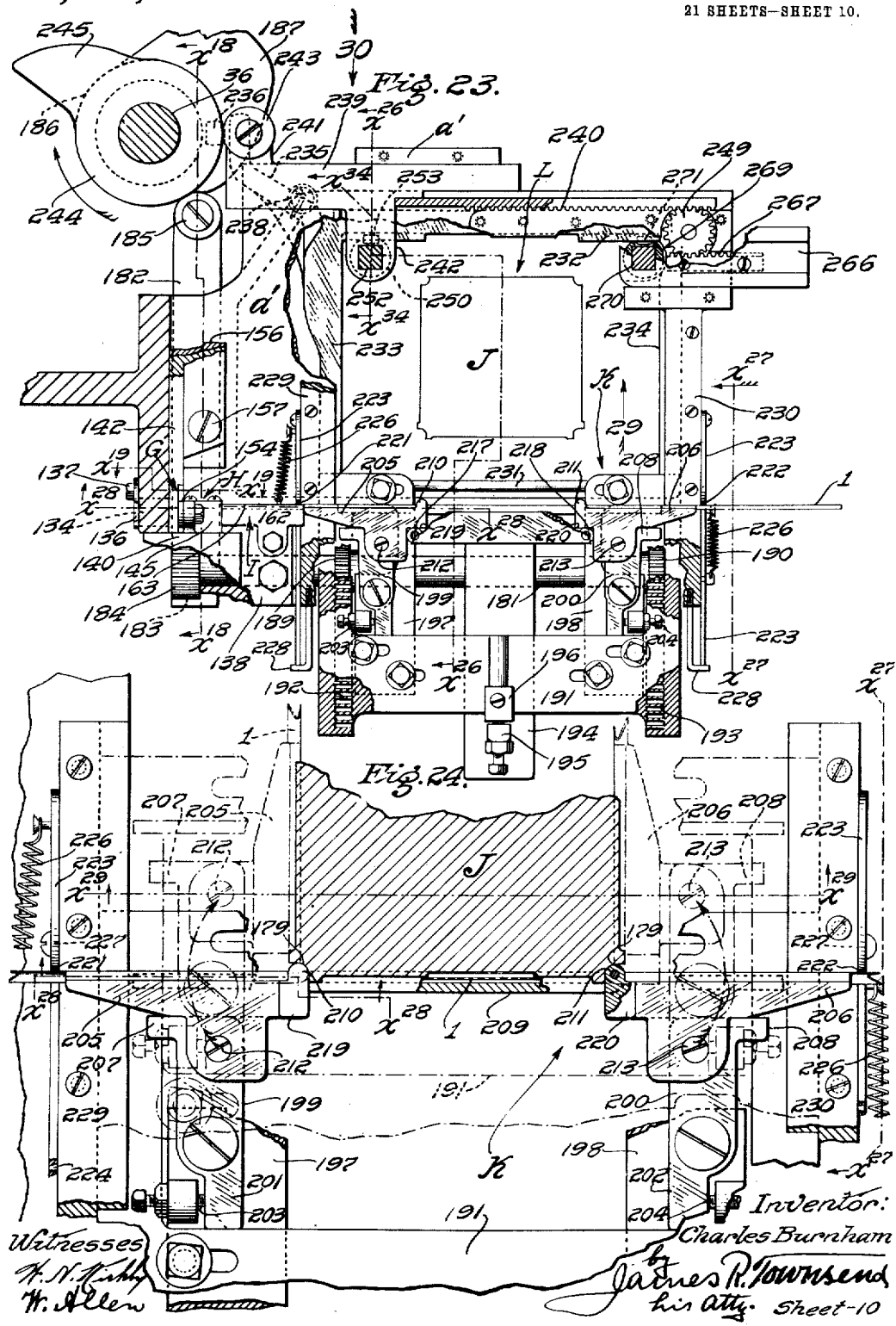

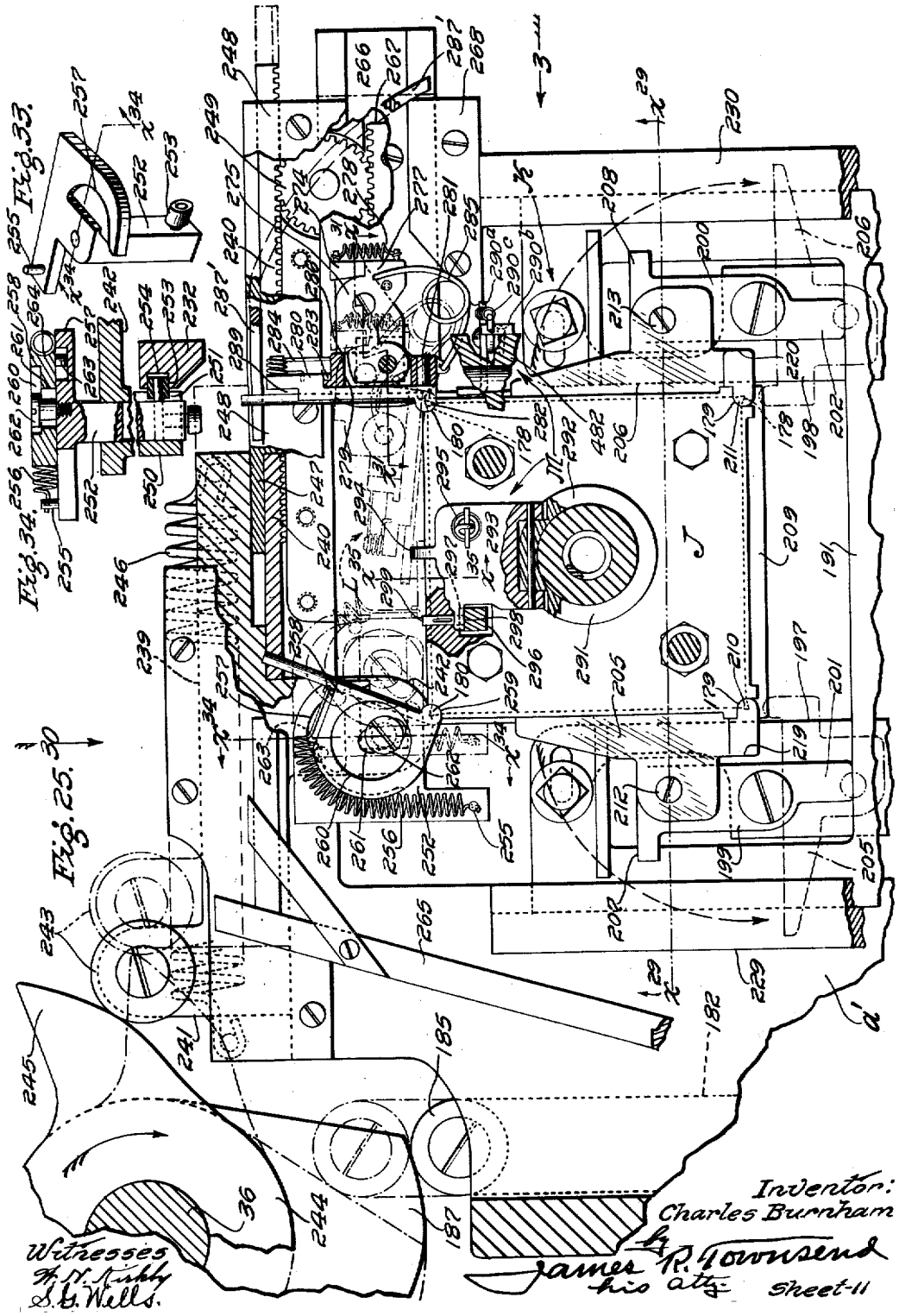

C. BURNHAM.
BOX MACHINE.
APPLICATION FILED DEC. 26, 1908. RENEWED APR. 27, 1914.
1,119,343.
Patented Dec. 1, 1914.
21 SHEETS—SHEET 12.
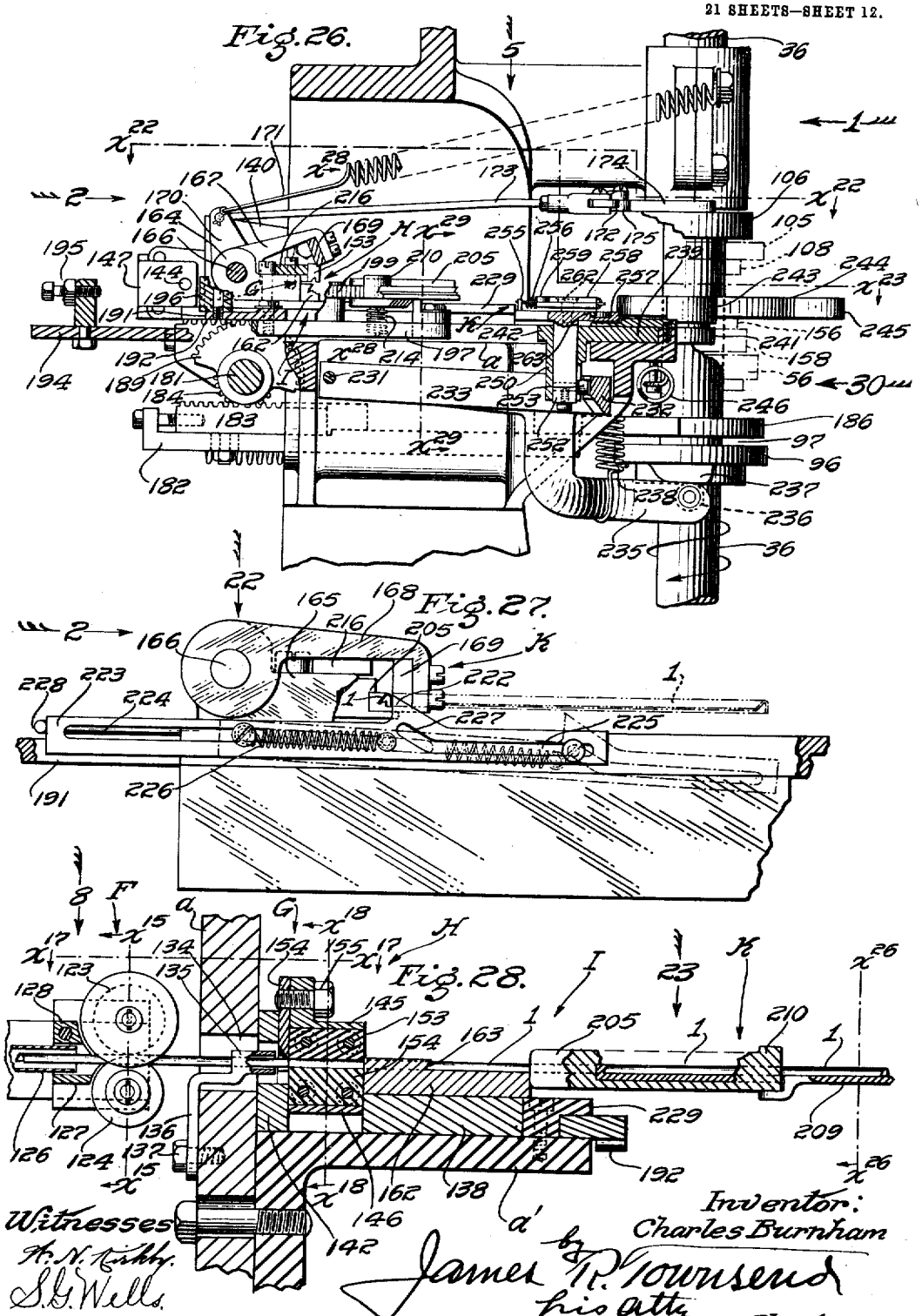

C. BURNHAM.
BOX MACHINE.
APPLICATION FILED DEC. 26, 1908. RENEWED APR. 27, 1914.
1,119,343.
Patented Dec. 1, 1914.
21 SHEETS—SHEET 13.
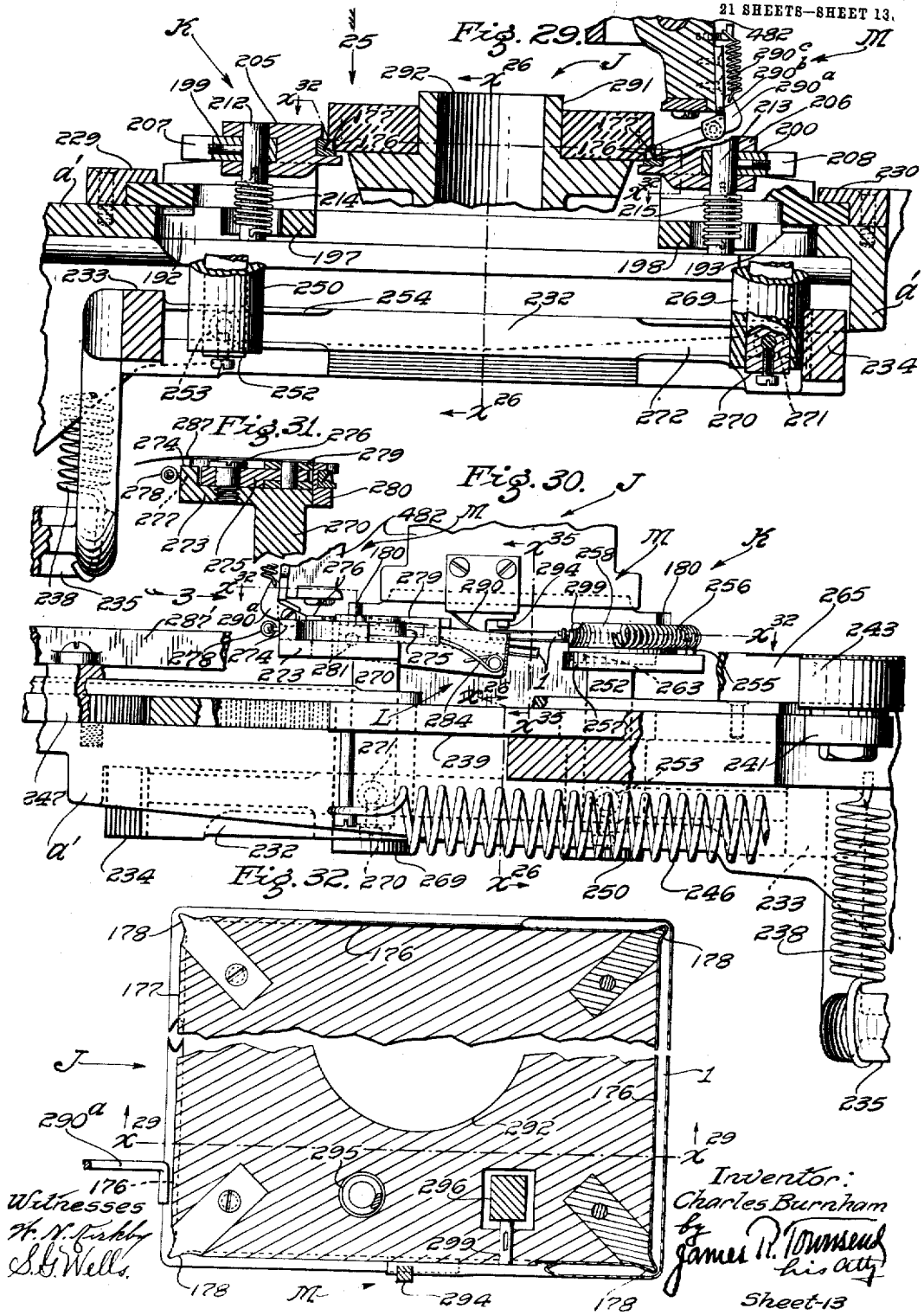

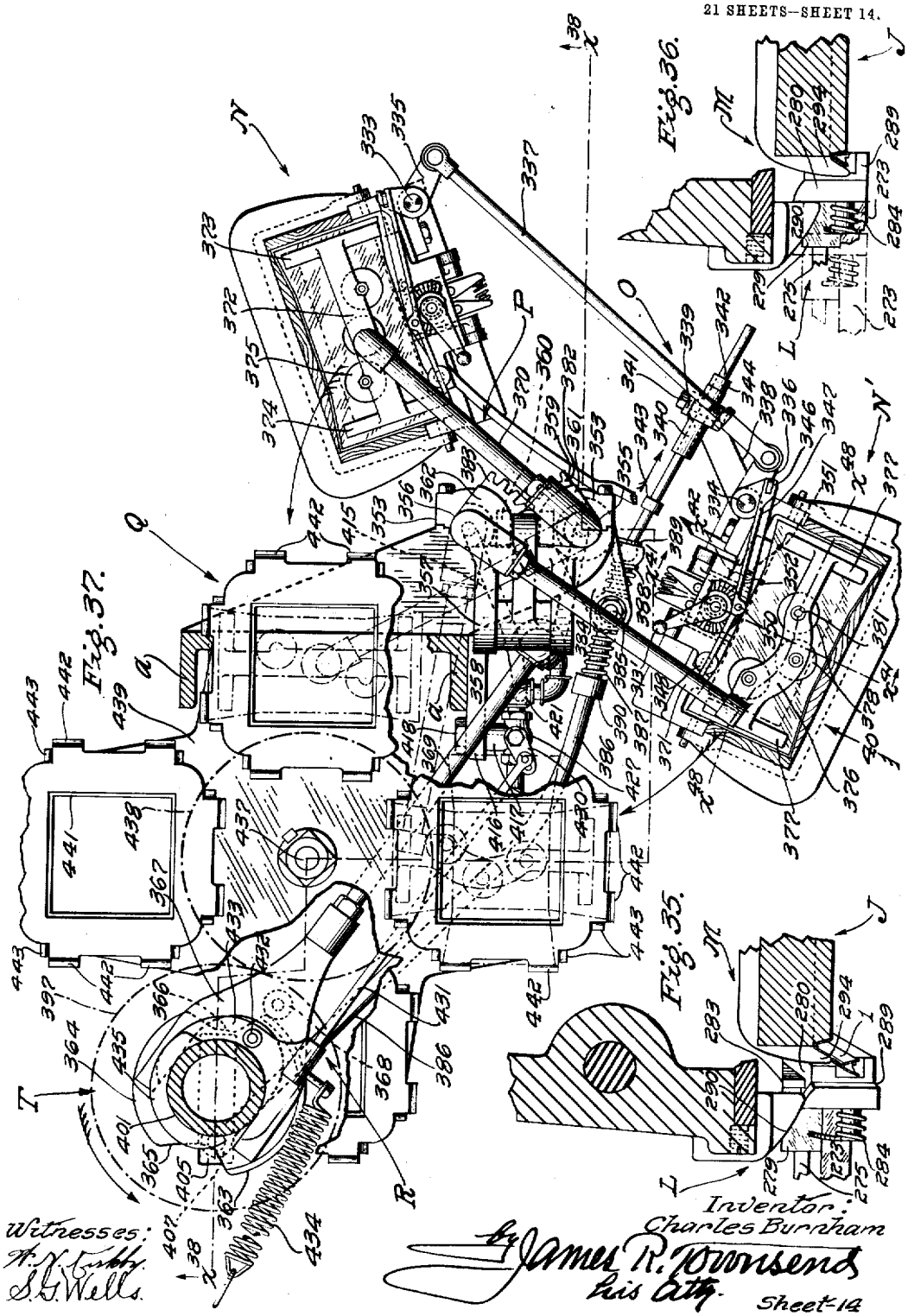

C. BURNHAM.
BOX MACHINE.
APPLICATION FILED DEC. 26, 1908. RENEWED APR. 27, 1914.
1,119,343.
Patented Dec. 1, 1914.
21 SHEETS—SHEET 15.
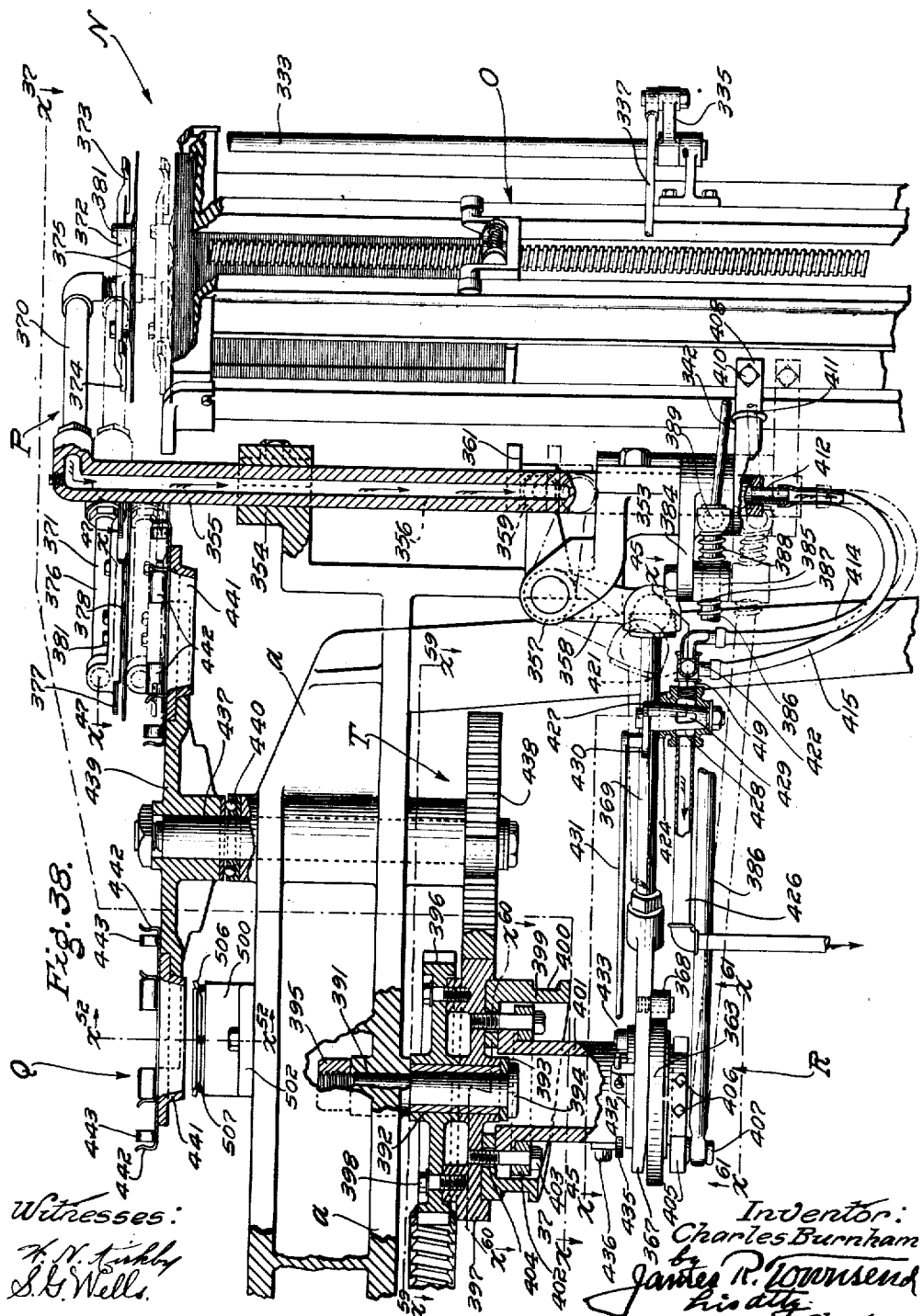

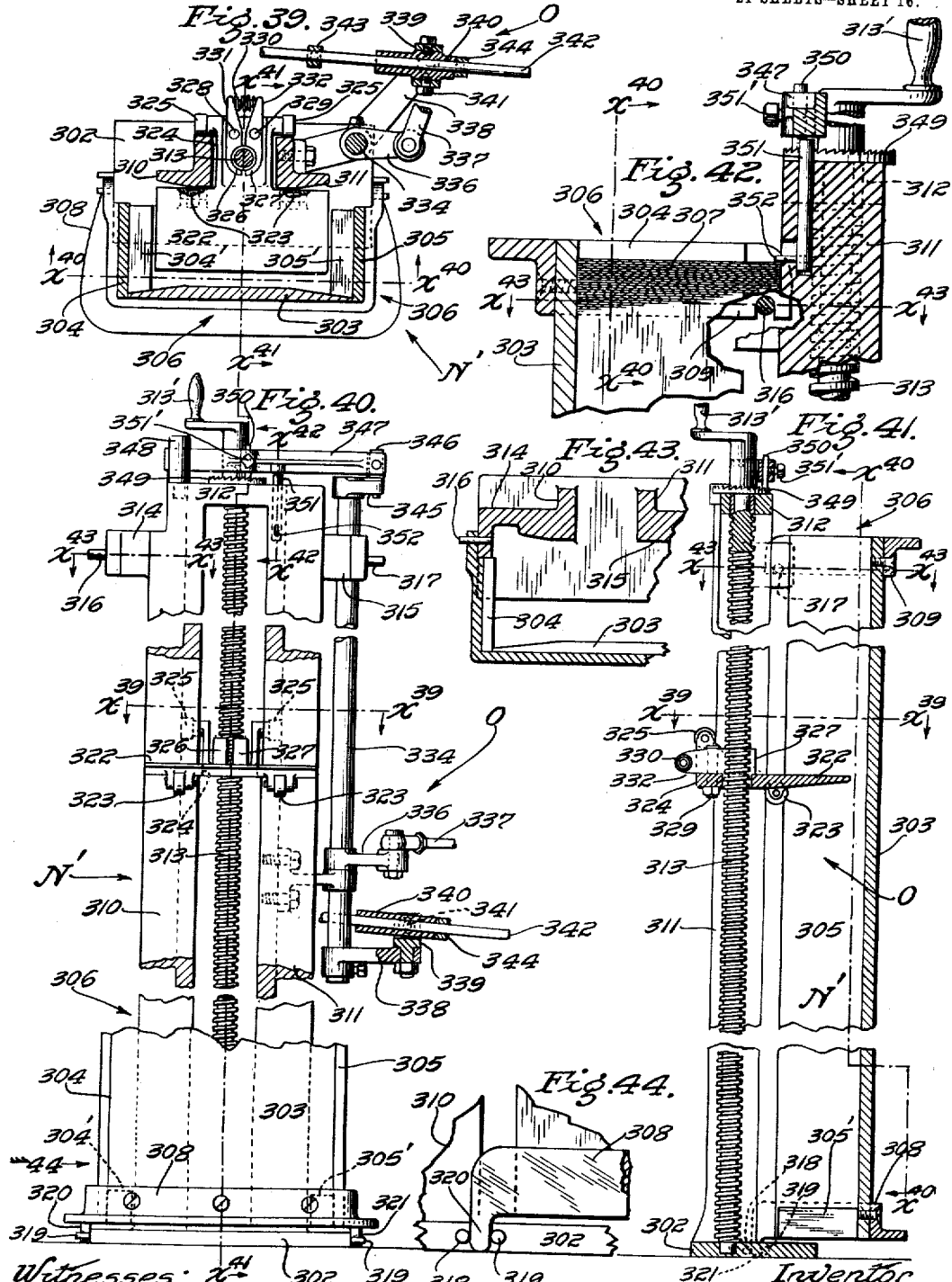

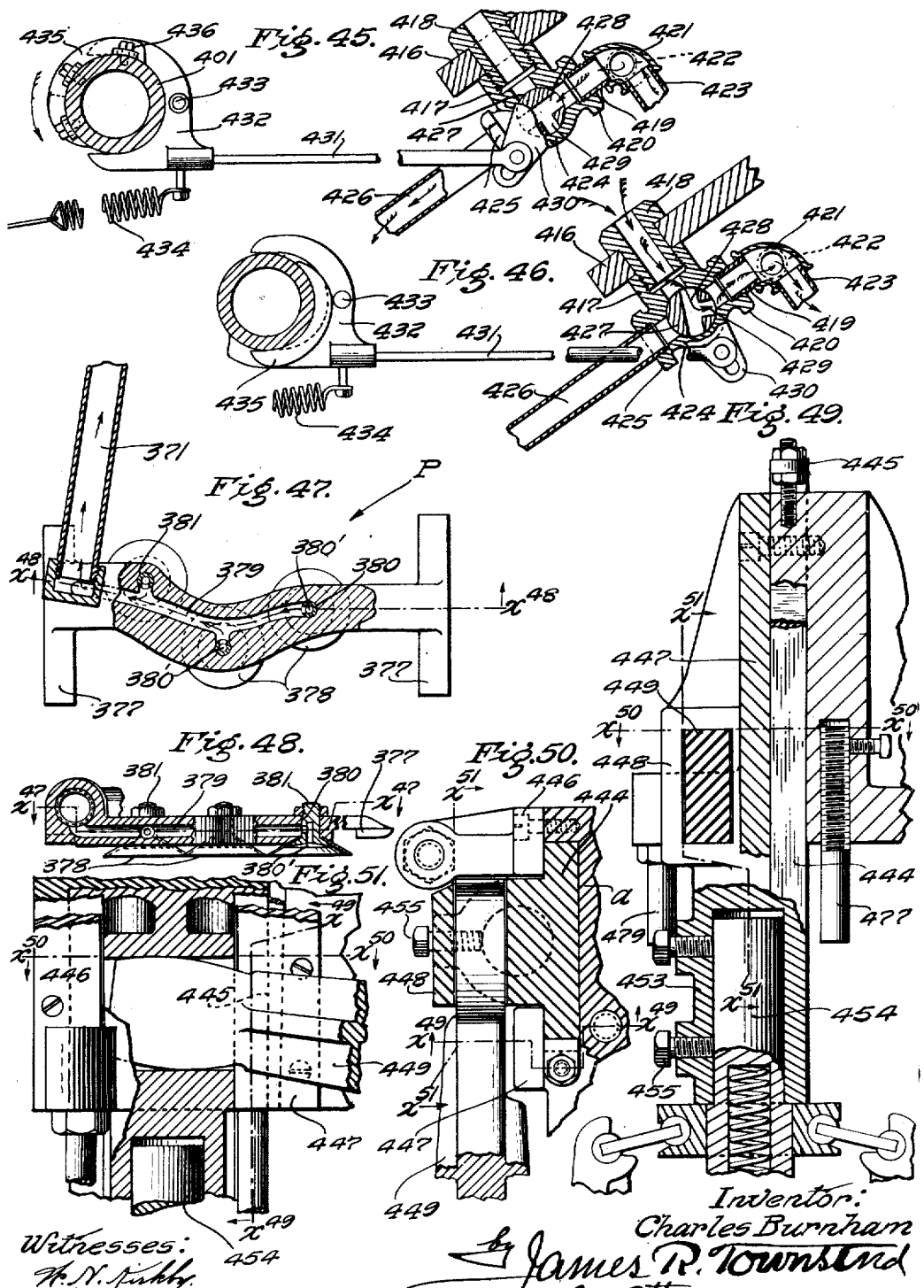

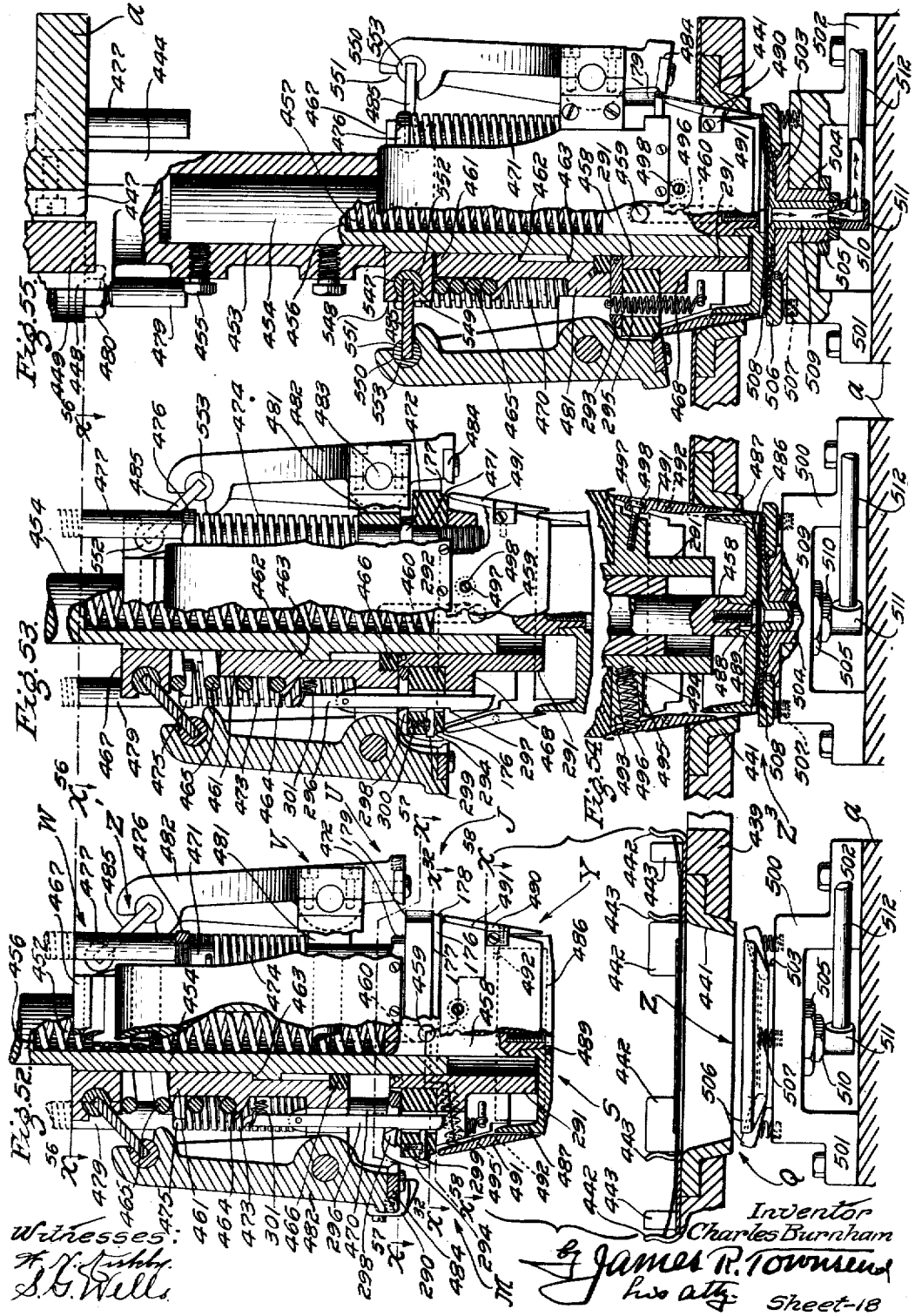

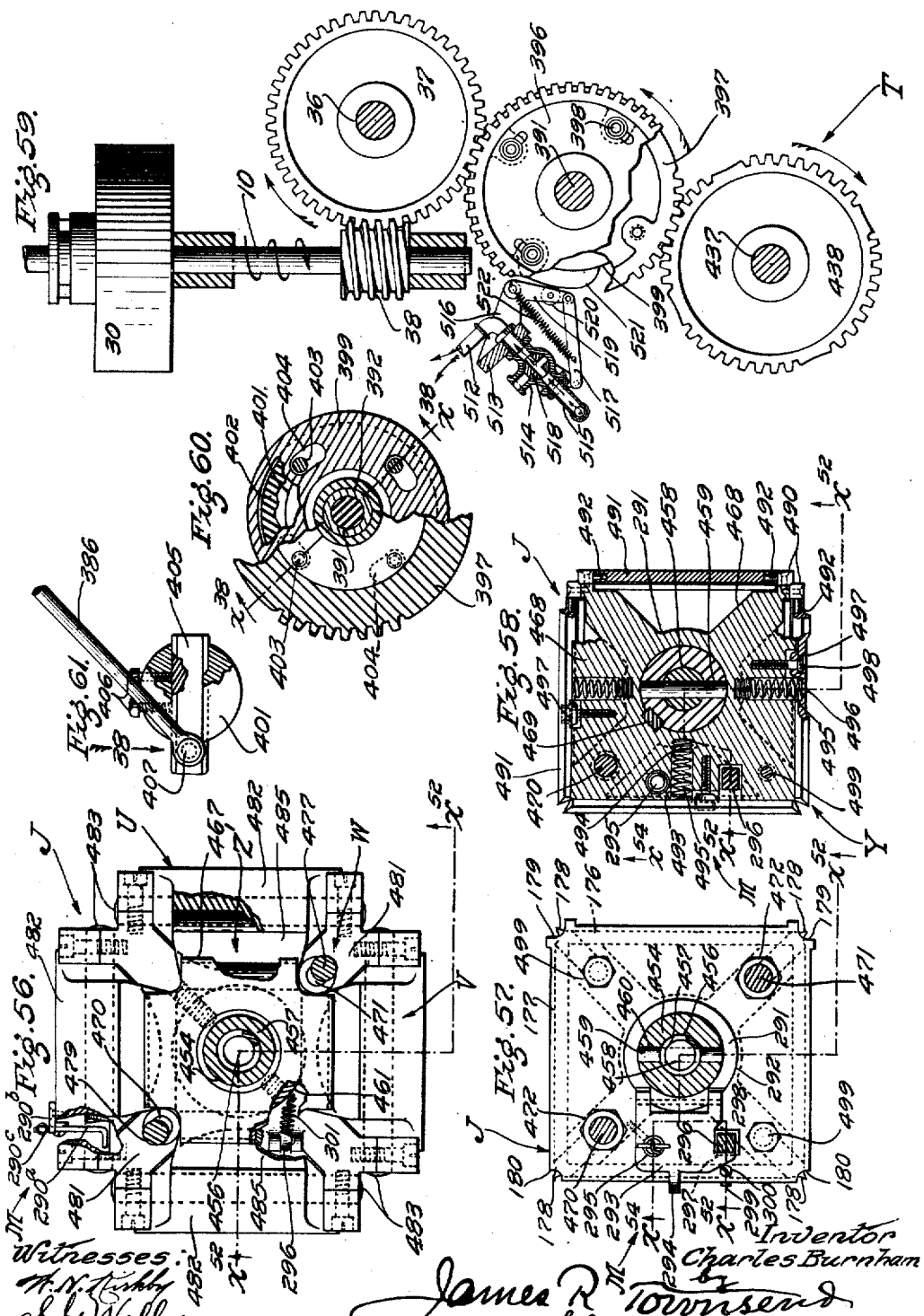

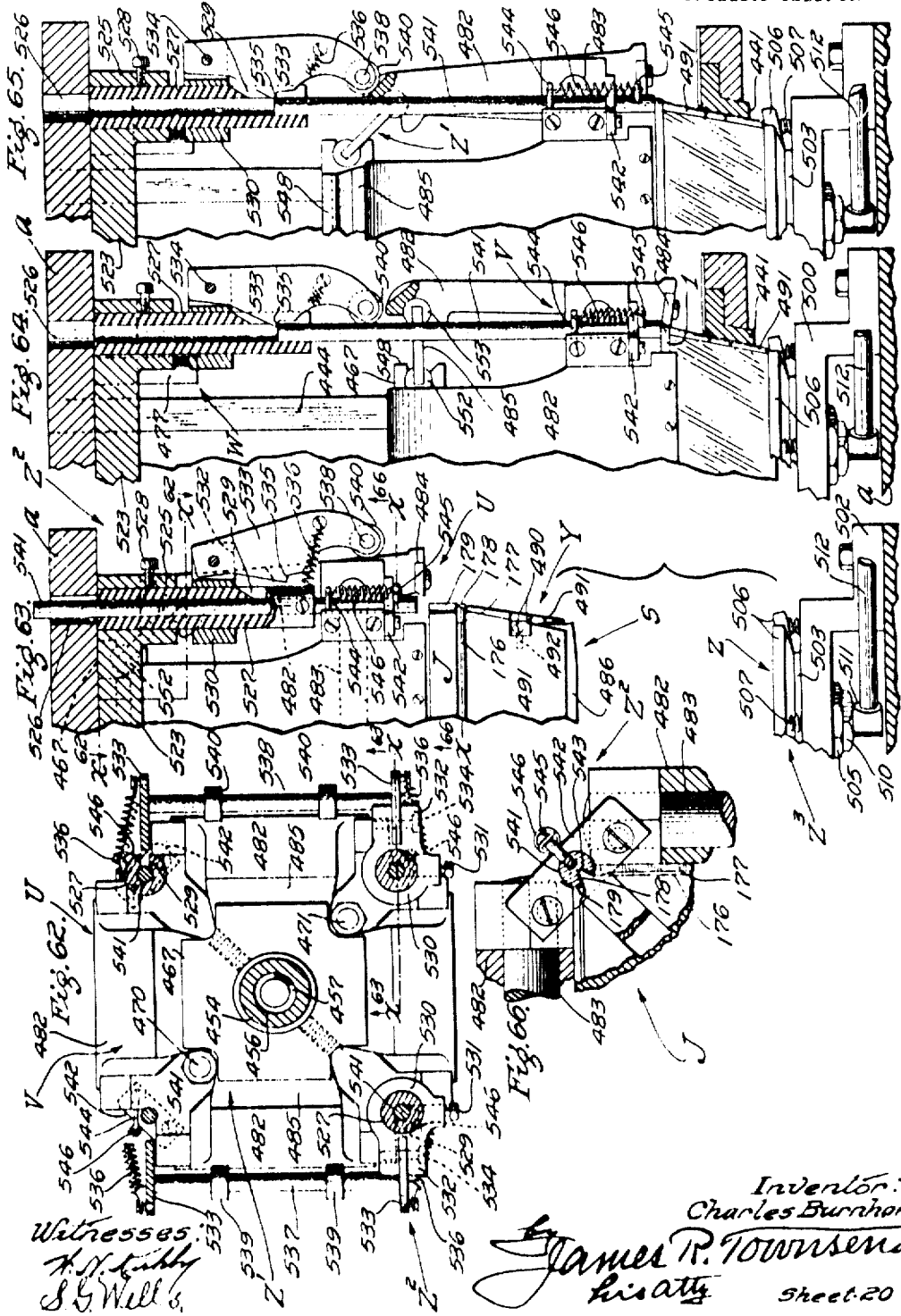

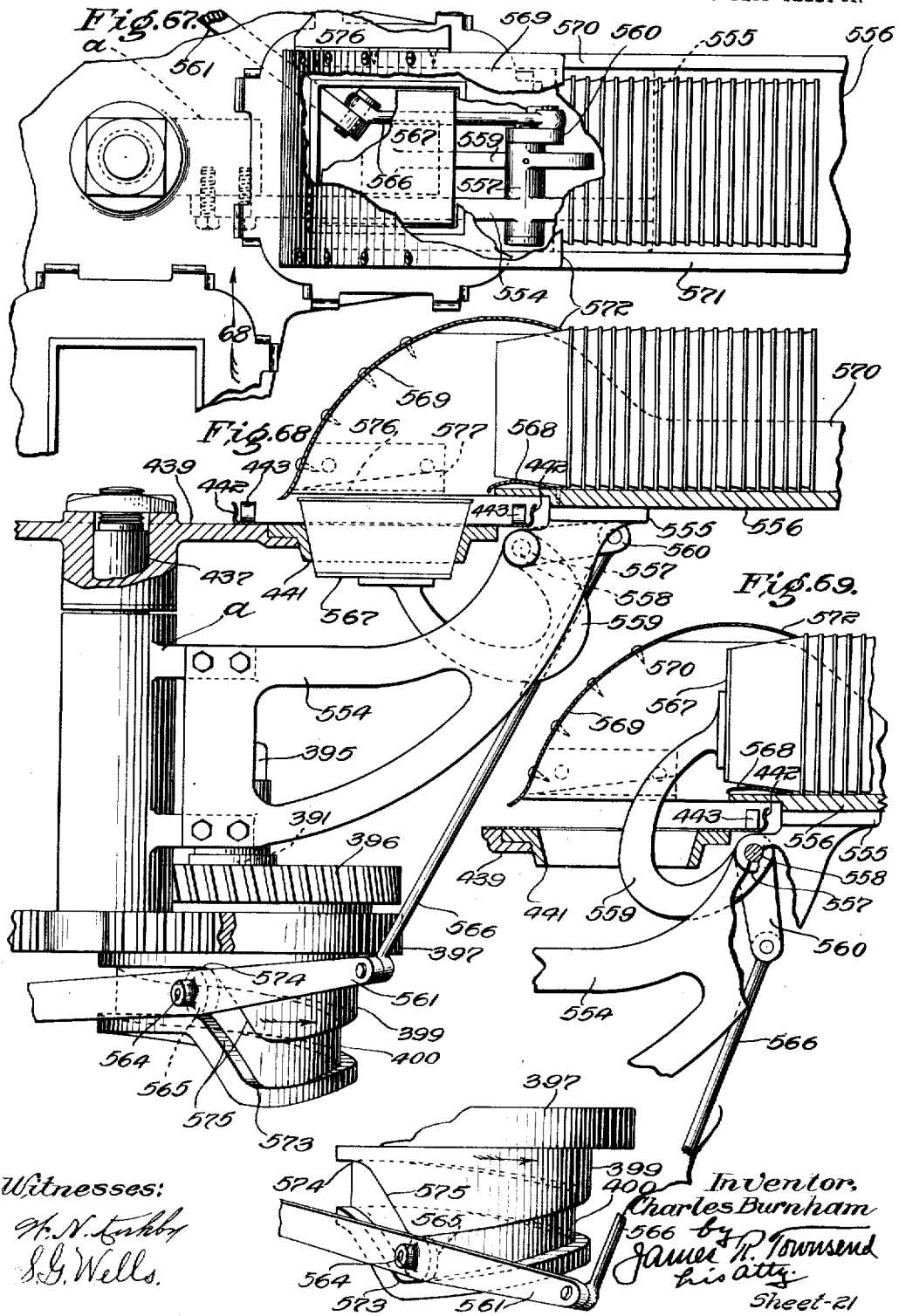

UNITED STATES PATENT OFFICE.

CHARLES BURNHAM, OF LOS ANGELES, CALIFORNIA, ASSIGNOR, BY MESNE ASSIGNMENTS, TO BURNHAM BASKET COMPANY, A CORPORATION OF CALIFORNIA.

BOX-MACHINE.

1,119,343.     Specification of Letters Patent.     Patented Dec. 1, 1914.

Application filed December 26, 1908, Serial No. 469,250. Renewed April 27, 1914. Serial No. 834,819.

*To all whom it may concern:*

Be it known that I, CHARLES BURNHAM, a citizen of the United States, residing at Los Angeles, in the county of Los Angeles and State of California, have invented a new and useful Box-Machine, of which the following is a specification.

My invention relates to automatic machines; an object being to produce a machine which will bring body-material into position; and which will measure binding-metal from a stock; and produce and discharge berry-boxes, or the like, at a high rate of speed.

My invention consists of the novel features herein shown, described and claimed.

The invention is pioneer in its nature and in numerous features; being the first machine which may be charged with shooks and metallic binding material, and, being connected with power and set into operation, will, without further attention continuously produce berry-baskets from such shooks and binding material so long as the charges thereof are unexhausted and the machine continues to run.

An object of the invention is to greatly increase the facility and reduce the cost of making berry and other boxes from shooks, and to provide means whereby a comparatively small plant may supply a large demand with practical independence from labor. This is accomplished by producing a unitary machine that automatically operates on materials of which such boxes may be made, and by a continuous round of successive operations, forms, finishes and delivers the boxes nested together ready for storage and shipment.

My automatic box-machine comprises: A, mechanism for advancing the binding-metal; B, mechanism for finishing the outer face of the binding-metal; $B^1$, mechanism for wiping the finished binding-metal; $B^2$, mechanism for coating the binding-metal; $B^3$, mechanism for wiping the coated binding-metal; C, mechanism for feeding the binding-metal intermittently; D, mechanism for centering the fed binding-metal; E, mechanism for folding the centered binding-metal; F, mechanism for tilting the folded binding-metal; G, mechanism for cutting the tilted binding-metal; H, mechanism for re-forming one end of the cut binding-metal; I, mechanism for guiding the cut binding-metal to the benders; J, mechanism in the form of a clenching anvil; K, mechanism for bending the binding-metal around the anvil; L, mechanism for overlapping the ends of the binding-metal upon the anvil; M, mechanism for holding the binding-metal upon the anvil; N, mechanism in the form of magazines for holding the stock of body-material; O, mechanism for feeding the body-material into position to be picked from the magazines; P, mechanism for picking the body-material from the magazines; Q, mechanism in the form of dies for forming the boxes; R, mechanism for operating the pickers to place the body-material in the dies; S, mechanism in the form of a punch to coöperate with the dies for forming the boxes; T, mechanism for moving the dies carrying the body-material to the punch; U, mechanism forming clenchers for the anvil; V, mechanism for moving the clenchers into operative position; W, mechanism for initially operating the punch; X, mechanism for moving the punch into the die to form the box; Y, mechanism for guiding the edges of the body-material between the open edges of the folded binding-metal; Z, mechanism for registering or evening the ends of the body-material; $Z^1$, mechanism for operating the clenchers to set the binding-metal upon the edges of the body-material; $Z^2$, mechanism for stripping the box from the punch; $Z^3$, mechanism for holding the box in the die while the punch is withdrawn; $Z^4$, mechanism for discharging the completed box from the machine, and placing the box in a stack.

The accompanying drawings illustrate an automatic box-machine embodying the principles of my invention.

Figure 1 is a front perspective taken from the operator's standpoint and looking in the direction indicated by arrows 1, Figs. 3, 4 and 5. Fig. 2 is a rear perspective looking in the direction indicated by arrows 2, Figs. 3, 4 and 5. Fig. 3 is a perspective of the shook end of the machine as indicated by arrows 3, Figs. 1, 2 and 5, the magazines being omitted. Fig. 4 is a perspective of the binding-metal end of the machine indicated by arrows 4, Figs. 1, 2 and 5. The roll of binding-metal and the binding-metal finishing-mechanism are omitted. Fig. $4^A$ is an enlarged detail of the mechanism for coating the binding-metal, on the same plane as Fig. 4, and also as indicated by the arrow $4^A$ in Fig. $4^B$. Fig. $4^B$ is a rear elevation of the parts shown in Fig. $4^A$. Fig. $4^C$ is a cross-sectional detail on line $x^{4C}$, Fig. $4^B$. Fig. 5 is a top plan view indicated by arrows 5, Figs. 1, 2, 3 and 4. Fig. 6 is an enlarged rear elevation of the binding-metal finishing mechanism and the binding-metal spool indicated by arrows 6, Figs. 1, 2, 5 and 7. Parts are broken away. Fig. 7 is a rear side elevation of the parts shown in Fig. 6, indicated by arrows, Fig. 5. Fig. 8 is an enlarged fragmental top plan of the mechanism for feeding, centering, folding, and tilting the binding-metal, indicated by arrows 8, Figs. 1, 2, 4 and 9. Fig. $8^A$ is a fragmental perspective detail of the adjustable cam 56. Fig. 9 is an enlarged front elevation of the parts shown in Fig. 8, indicated by arrows 9, Figs. 4, 5 and 8. Fig. 10 is an enlarged fragmental rear elevation of the mechanism for centering, folding, and tilting the binding-metal, indicated by arrows 10, Figs. 5, 8 and 11. Fig. 11 is a vertical cross-section of the parts shown in Fig. 10 and taken on line $x^{11}$, Figs. 2, 5, 8, 9, and 10. Fig. 12 is an enlarged vertical cross-section of the mechanism for centering and folding the binding-metal, indicated by line $x^{12}$, Figs. 2, 5, 8, 9 and 10, and showing the centering-mechanism and the folding-mechanism open. Fig. 13 is a view analogous to Fig. 12 and showing the centering-mechanism closed and the folding-mechanism open with the binding-metal in a central position ready to be folded. Fig. 14 is a view analogous to Figs. 12 and 13 and showing the folding-mechanism closed. Fig. 15 is an enlarged cross-section of the mechanism for tilting the folded binding-metal, taken on line $x^{15}$, Figs. 5, 8, 10, 17, and 28. Fig. 16 is a horizontal sectional detail on line $x^{16}$, Figs. 2, 9, 10, 11 and 12. Fig. 17 is a horizontal sectional detail on line $x^{17}$, Figs. 2, 18, 19 and 28. Fig. 18 is a vertical sectional detail on lines $x^{18}$, Figs. 2, 5, 17, 19, 22, and 28. Fig. 19 is a cross-section on line $x^{19}$, Figs. 17 and 18. Fig. 20 is a rear fragmental detail of the mechanism for feeding the binding-metal intermittently, as indicated by arrows 20, Figs. 4, 8 and 21. Fig. 21 is a cross-sectional detail of the parts shown in Fig. 20 on lines $x^{21}$, Figs. 2, 5, 8 and 20. Fig. 22 is a horizontal section on lines $x^{22}$, Figs. 1, 3, and 26, drawn for the purpose of showing a plan of the mechanism for bending the binding-metal around the anvil and the coöperating parts. Fig. 23 is a horizontal section on line $x^{23}$, Figs. 1, 3 and 26, and showing the parts in different positions from those shown in Fig. 22. Fig. 24 is a view analogous to Figs. 22 and 23 and showing the further advancement of the parts. Fig. 25 is a view analogous to Figs. 22, 23 and 24, and showing still further advancement in the steps of forming the binding. Fig. 26 is a vertical cross-section on line $x^{26}$, Figs. 1, 2, 5, 22, 23, 28, 29, and 30. Fig. 27 is a side elevation of a fragment of the machine as seen looking in the direction indicated by line $x^{27}$ Figs. 2, 5, 22, 23, and 24. Fig. 28 is a vertical longitudinal section on line $x^{28}$, Figs. 17, 18, 23, and 24, drawn for the purpose of showing the passage of the binding metal from the folder through tilter, cutter, and reformer to the benders. Fig. 29 is a vertical cross-section on line $x^{29}$, Figs. 3, 24, 25, 26, and 32. Fig. 30 is a side elevation of the parts seen as indicated by the arrow 30 in Figs. 3, 5, 22, 23, 25 and 26. Fig. 31 is a vertical sectional detail on line $x^{31}$, Fig. 25. Fig. 32 is a horizontal sectional detail on lines $x^{32}$, Figs. 29, 30, and 52, said figure being a plan of the folded binding held in place upon the anvil ready to be applied to the basket-body. Fig. 33 (sheet 11), is an enlarged perspective of one of the vertically reciprocating posts for operating one of the bender-jaws. Fig. 34 (sheet 11), is a vertical sectional detail on line $x^{34}$, Fig. 33, with other parts added and taken on line $x^{34}$, Fig. 25. Fig. 35 is a sectional detail upon an enlarged scale on line $x^{35}$, Figs. 25 and 30. with a part of one of the clenchers added to illustrate the operation of overlapping the ends of the folded binding and showing the operation nearly completed. Fig. 36 is a view analogous to Fig. 35 and showing the operation of overlapping the ends of the folded binding completed in full lines, and showing the beginning of the operation in dotted lines. Fig. 37 is a horizontal section upon an enlarged scale taken upon an irregular line substantially as indicated by $x^{37}$—$x^{37}$, Figs. 1, 2 and 38, drawn for the purpose of showing a plan of the magazine for holding the stock of body-material, the dies for receiving the body-material, and the mechanism for placing the body-material in the dies. Fig. 38 is a vertical section upon an irregular line substantially as indicated by line $x^{38}$, Figs. 5 and 37, parts being broken away to economize space. Fig. 39 is a horizontal section through one of the magazines on lines $x^{39}$, Figs. 40 and 41. Fig. 40 is a vertical sectional detail on line $x^{40}$, Figs. 5, 39, 41 and 42. Fig. 41 is a vertical section crosswise of Fig. 40 and taken on lines $x^{41}$, Figs. 5, 37, 39 and 40. Fig. 42 is a fragmentary sectional detail on lines $x^{42}$, Figs. 37 and 40. Fig. 43 is a fragmentary horizontal section on lines $x^{43}$, Figs. 40, 41 and 42. Fig. 44 is a fragmentary side elevation as indicated by the arrow 44 in Fig. 40. Fig. 45 is a horizontal fragmentary sectional detail on line $x^{45}$, Fig 38. Fig. 46 is a view analogous to Fig. 45 and showing the parts in different positions.

Fig. 47 is a horizontal sectional detail on lines $x^{47}$, Figs. 38 and 48. Fig. 48 is a vertical sectional detail on lines $x^{48}$, Figs. 37 and 47. Fig. 49 is an enlarged transverse section showing the details of the punch-slide and taken on lines $x^{49}$, Figs. 1, 50 and 51. Fig. 50 is a horizontal sectional detail of the parts shown in Fig. 49 and taken on lines $x^{50}$, Figs. 1, 3, 49 and 51. Fig. 51 is a sectional elevation on lines $x^{51}$, Figs. 49 and 50. Fig. 52 is an enlarged sectional elevation illustrating the punch and dies and showing the punch elevated to receive the binding upon the anvil and to receive the die carrying the body-material, and taken on lines $x^{52}$, Figs. 1, 2, 5, 56, 57 and 58. Fig. 53 is a view analogous to Fig. 52, the die-mechanism being omitted and showing the parts slightly advanced. Fig. 54 is a view analogous to Fig. 52, the upper part of the mechanism being broken away and showing the punch down in the die with the box formed and the binding in position to be applied to the edge of the box. Fig. 55 is a view analogous to Fig. 52 and showing the completion of the operation of forming the box and applying the binding thereto. Fig. 56 is a horizontal section on lines $x^{56}$, Figs. 52, 53 and 55. Fig. 57 is a horizontal section upon line $x^{57}$, Fig. 52. Fig. 58 is a horizontal section upon line $x^{58}$, Fig. 52. Fig. 59 is a view showing the transmission of power from the main-shaft through the worm and the worm-gear to the cam-shaft and from the cam-shaft to the mechanism for operating the dies and placing the body-material in the dies, and illustrating the mechanism for holding the box in the die, and taken substantially on line $x^{59}$, Figs. 1, 2 and 38. Fig. 60 is a horizontal section of the central gear combination shown in Fig. 59 and taken on line $x^{60}$, Fig. 38. Fig. 61 is a bottom plan detail of the central gear combination shown in Fig. 59 and indicated by lines $x^{61}$, Figs. 1 and 38. Fig. 62 is a plan of the mechanism for stripping the box from the punch and taken on lines $x^{62}$, Figs. 1, 2, 3 and 63. Fig. 63 is a sectional elevation on line $x^{63}$, Fig. 62. Fig. 64 is a view analogous to Fig. 63 and showing the parts further advanced. Fig. 65 is a view analogous to Figs. 63 and 64, and showing the completion of the operation. Fig. 66 is a fragmental horizontal section on line $x^{66}$, Fig. 63. Fig. 67 is a top plan view of the mechanism for discharging the completed box from the machine, and placing the box in a stack in a chute. Fig. 68 is a side elevation of the parts shown in Fig. 67 as indicated by the arrow 68, parts being shown in section. Fig. 69 is a view analogous to Fig. 68, and showing the parts in different positions.

The stock of binding-metal 1 is wound upon a spool 2, and the spool is mounted upon a spindle 3 projecting horizontally from near the center of the post 4, said post being mounted upon the base 5. The binding-metal is a flat strip of the proper width to make the binding of the box.

The mechanism A for advancing the binding-metal comprises a bearing-block 6 mounted upon the base 5; a shaft 7 in the bearing-block; a large driving-pulley 8 upon the shaft 7; a belt 9 connecting the driving-shaft 10 to the pulley 8; a frame 11 pivotally mounted upon the shaft 7; a pulley 12 carried by the free end of the frame 11; a belt 13 extending around the pulley 12 and around the pulley 14 upon the shaft 7; the guide-roller 15 carried by the upper part of the main frame; the cable 16 connected to the frame 11 and extending upwardly over the guide-roller 15; and the weight 17 attached to the cable; so that the belt 13 will engage the binding-metal 1 upon the spool 2 and the weight 17 will pull the frame 11 upwardly to hold the belt 13 against the binding-metal and rotate the spool to unwind the binding-metal just fast enough to furnish the required amount of binding for the boxes.

The mechanism B for finishing the binding-metal comprises a buffing-wheel 18 and a suitable means for operating the buffing-wheel mounted upon the post 4; a bracket 19 extending from the post 4 under the buffing-wheel 18; bifurcated arms 20 and 21 mounted upon the pivot 22 carried by the bracket 19, said bracket being bifurcated to receive the arms; the guide-rollers 23 and 24 mounted between the bifurcations of the arms 20 and 21 upon spindles; and the retractile coil-spring 25 connecting an ear upon the arm 20 with an ear upon the arm 21; so that the binding-metal 1 will pass upwardly over the guide-rollers 23 and 24 and be pressed yieldingly against the buffing-wheel 18 so as to buff and finish the upper surface of the binding-metal as it passes to the machine to be used.

The bifurcations of the arms 20 and 21 are connected closely across the tops of the guide-rollers 23 and 24 so as to guide and hold the binding-metal in place upon the guide-rollers. The buffing-wheel 18 may be run in the direction indicated by the arrow in Fig. 7, so that the friction of the buffing-wheel upon the binding-metal will tend to draw the binding-metal from the spool as fast as the spool is operated by the mechanism A to unwind the binding-metal.

The base 5 supports the entire machine, and the superstructure of the frame $a$ is supported upon posts $25^a$, 26, 27, 28 and 29 securely mounted upon the base 5. The driving-shaft 10 is mounted horizontally longitudinally of the base, and in bearings supported by the posts 25, 26 and 27. The drive-wheel 30 is loosely mounted upon the shaft 10 near the center of the machine and may be connected to the engine-motor or other source of power by a belt.

A fly-wheel 31 is fixed upon the shaft 10 near the drive-wheel, and a clutch-mechanism 32 is mounted upon the shaft, to be controlled by the operating-lever 33 to connect and disconnect the drive-wheel 30 to the shaft 10. The operating-lever is connected at its lower end to the base by the pivot 34, and the central portion of the operating-lever is bifurcated to receive the clutch-mechanism 32 and is connected to the clutch-mechanism by the pivot-pins 35, so that when the upper end of the lever which serves as a handle for the operator is moved one way the machine is started and when the lever is moved the other way the machine is stopped.

The front side of the machine, as shown in Fig. 1, is the operator's side of the machine, and the handle 33 is in convenient position for use from that position. The driving-shaft 10 runs at a comparatively high rate of speed, and the shaft 7 is set at right angles to the driving-shaft, and the binding-metal is to be fed at a comparatively slow speed, so that the belt 9 is crossed to run from the shaft 10 to the pulley 8, and the pulley 8 is large, and the belt runs directly upon the shaft so as to drive the shaft 7 at a much slower speed, and the pulley 14 is small so as to drive the belt 13 at a low rate of speed. It is obvious that all of these proportions must be studied so as to feed the binding-metal at a speed equal to the demands of the machine.

A large number of the motions of the machine are derived directly from the cam-shaft 36, said cam-shaft being mounted vertically near the center of the machine. A helical toothed gear 37 is fixed upon the lower end of the cam-shaft and meshes with the worm 38 upon the driving-shaft 10.

The mechanism B¹ for wiping the finished binding-metal is shown in detail in Figs. 4ᴬ and 4ᴮ.

A box is mounted upon the side of the frame a and comprises the bottom b for the binding-metal 1 to rest upon as it passes to the machine, a flaring mouth c leading to the bottom b, said box containing the waste or other suitable wiping material d, and there being a removable side plate e held in place by wing-nuts to provide access to the wiping material, and there being an adjustable pressure-plate f regulated by the feed-screw g so that the tension of the wiping material upon the binding-metal may be regulated, and so that the wiping material may be removed and renewed; the object of this wiping material being to remove all the dirt from the binding-metal before it passes into the lacquer.

The mechanism B² for coating the binding-metal is shown in enlarged details in Figs. 4ᴬ and 4ᴮ. Lacquer or other coating may be used. The lacquer-can h is mounted upon the frame a directly in front of the mechanism B, and the can is provided with an air-tight filling nipple i and an air-tight drain-valve j. The lacquer-pan k is mounted below the can h upon the side of the frame a, said pan being normally open at the top, and the pipe l leads from the drain-valve j into the pan k, the receiving end of the pipe being open; and the feed-adjusting tube m is adjustably mounted upon the nipple n of the drain-valve so as to provide a student-lamp feed from the lacquer-can h to the lacquer-pan k, thereby maintaining the desired level of lacquer o in the pan k. As the lacquer is used and the level lowered, air will be admitted to the can h through the drain-valve j, thereby releasing more lacquer. A guide-roller p is mounted in position to depress the binding-metal 1 into the lacquer o in the pan k so that as the binding metal is advanced into the machine it is submerged in lacquer.

The mechanism B³ for wiping the coated binding-metal is shown in enlarged detail in Figs. 4ᴮ and 4ᶜ. The wiper-base q is secured to the side of the frame a by a cap-screw and a channel r is cut in the face of the base in the line of travel of the binding-metal 1. Leather wiping-pads s and t are mounted in the bottom of the channel r with the binding-metal passing between the pads as it passes from the lacquer o. A clamping-plate u is secured to the side of the base q by the cap-screw v provided with an operating-handle w, and a finger x extends from the clamping-plate u behind the wiping-pads s and t against the edge of the binding-metal to hold the binding-metal in line. A presser-plate y is mounted upon the wiping-pad s and held adjustably in position by the adjusting-screw z, so that the pressure of the wiping-pads s and t upon the binding metal may be regulated by manipulating the screw z. The wiping-pads are located close to the edge of the lacquer-pan k so that the lacquer wiped from the binding-metal will drain into the pan.

The mechanism C for feeding the binding-metal intermittently comprises the eccentric sleeves 39 and 40 mounted transversely and in parallel position; the interlocking teeth 41 and 42 for connecting the sleeves together; the compression-shafts 43 and 44 rotatably mounted in the eccentric sleeves; the gears 45 and 46 connecting the shafts together; the compression feed-rollers 47 and 48 upon the opposite ends of the shaft; means for driving the compression-shafts, and means for operating the eccentric sleeves. A bevel-gear 49 is fixed upon one of the compression-shafts and meshes with the bevel-gear 50 upon the countershaft 51, and a sprocket-chain 52 connects a sprocket-wheel upon the counter-shaft 51 with a sprocket-wheel upon the driving-shaft 10, so as to rotate the compression feed-rollers 47 and 48 continuously when the driving-shaft is running.

A pair of teeth 53 project downwardly from the eccentric-sleeve 40; a lever 54 is mounted upon a pivot 55 transversely of the machine with one of its ends between the teeth 53. An adjustable cam 56 is fixed upon the cam-shaft 36, said cam having an outer concentric peripheral surface 57 and an inner concentric peripheral surface 58. The connecting-rod 59 is forked at one end to slide upon the cam-shaft 36 under the cam 56, and a roller 60 mounted upon the connecting-rod engages the cam surfaces 57 and 58 so as to reciprocate the connecting-rod by the rotation of the cam-shaft.

The connecting-rod 59 is bored at the opposite end from the cam-shaft 36 to receive the sliding extension 61, and this sliding extension is connected to the lever 54 by a bolt 62. An adjusting-rod 63 is connected to the connecting-rod 59 and slides through the bolt 62, there being an adjusting-nut 64 upon the rod 63 provided with a handle, and a jam-nut 65 to hold the adjusting-nut in its adjusted position.

An expansive spring 66 is mounted upon the extension 61 against the end of the connecting-rod 59 to hold the connecting-rod mechanism in its extended position. As the cam-shaft 36 rotates the connecting-rod mechanism 59 operates the lever 54 to operate the eccentric-sleeves 39 and 40 to move the compression feed-rollers 47 and 48 to and from each other, and the binding-metal 1 passes between the compression feed-rollers and is drawn from the finishing and unwinding mechanism and fed to the folding mechanism, and the amount of metal fed at each cycle of the machine is determined by the relative lengths of the peripheral faces 57 and 58.

The cam 56 is adjustable as shown in Fig. 8^A to change the relative lengths of the peripheral faces 57 and 58. The extension block 57^a has a tongue-and-groove connection with the end of the peripheral face 57, and the screw 57^b inserted through an elongated slot in the block and screw-seated in the body of the cam forms a sliding connection for the block, so that the block forms an adjustable extension of the peripheral face 57, and by manipulating this extension the length of feed of the binding-metal 1 may be regulated.

A retractile coil spring 67 connects the connecting-rod 59 to the frame so as to hold the compression feed rollers normally separated or inactive, and so as to press the roller 60 against the cam 56, and when the roller 60 is against the surface 58 of the cam the compression feed rollers 47 and 48 are open and inactive; and when the cam 56 turns and the roller 60 rides upon the surface 57 the compression feed rollers 47 and 48 are moved toward each other to grip the binding-metal. A pressure adjusting wedge 68 is secured to the frame by a bolt 69 in position to regulate the swing of the teeth 53 so as to regulate the pressure of the compression rollers upon the binding-metal. The wedge is adjusted by loosening the bolt and rotating the wedge slightly one way or the other and then tightening the bolt.

When the connecting-rod mechanism operates to bring the rollers to exert the desired pressure upon the binding-metal the teeth 53 will press against the wedge 68 and the continued operation of the cam 56 will press the spring 66 and slide the extension 61 into the end of the connecting-rod 59 and slide the rod 63 through the pin 62. The connection between the connecting-rod 59 and the lever 54 may be minutely adjusted by manipulating the adjusting-nut 64 and the jam-nut 65.

The mechanism D for centering the fed binding-metal comprises the centering-bars 70 and 71 mounted in position so that the binding-metal 1 passes from the feed-rollers 47 and 48 between the bars 70 and 71, the bars being open as shown in Fig. 12 when the binding-metal is moving and the bars being closed as shown in Fig. 13 during the operation of folding the fed binding-metal; and the mechanism for centering the fed binding-metal includes the connections from the driving-shaft 10 to the bars 70 and 71 for opening and closing said bars.

The mechanism E for folding the centered binding-metal comprises a rigid inverted V-shaped folder-member 72 and a reciprocating folder member 73, and the mechanism for operating the folder from the driving-shaft. The folder-member 72 is formed upon or attached to the face of the folder-plate 74, said folder-plate being removably and rigidly secured to the frame by bolts 75. The reciprocating folder-member 73 is a thin strip of hardened steel mounted in a holder 76 in opposition to the rigid member, and in turn this holder 76 is mounted in a reciprocating-head 77. A recess or seat 78 is formed in the frame to receive the reciprocating-head 77 so that the head may reciprocate from the open position of the folder as shown in Fig. 12 to the closed position of the folder as shown in Fig. 14.

Three pairs of shafts 79 and 80 are mounted vertically in transverse alinement through the reciprocating-head 77, and segmental gears 81 fixed upon the lower ends of the shafts 79 and 80 interlock to connect the shafts together. Cranks 82 are fixed upon the upper ends of the shafts, and the centering bars 70 and 71 are mounted upon the pins of the cranks. The heads 83 are pivotally mounted upon the set-screws 84, said set-screws being seated in the gears 81 and set against the shaft 80 to hold the gears in place.

Levers 85 are pivotally mounted upon lag-screws 86 seated in the frame, the upper ends of the levers being bifurcated to slidingly mount the heads 83. A connecting-rod 87 is mounted through the lower ends of the levers 85, there being a set-collar 88 upon one side of each of the levers and a sliding collar 89, an expansive spring 90 and a set-collar 91 upon the other side of each of the levers as shown in Fig. 10. A lever 92 is pivotally mounted transversely of the machine, one end of the lever being slotted to receive the connecting-rod 87, and there being a set-collar 93 upon the connecting-rod to hold the lever 92 against one of the set-collars 88. A retractile coil-spring 94 connects an arm projecting from the lever 92 to an adjusting-bolt 95 slidingly mounted through a stud projecting from the frame; the tension of the spring 94 being exerted in opposition to the tension of the springs 90 as shown in Fig. 10. A cam 96 is mounted upon the cam-shaft 36; a cam-fork 97 is mounted to slide endwise upon the shaft 36 on top of the cam 96; a connecting-rod 98 connects the cam-fork to the lever 92; and a roller 99 carried by the cam-fork engages the periphery of the cam 96, said cam 96 being shaped to cause a vibration of the lever 92, thereby reciprocating the centering-bars 70 and 71 to center the fed binding-metal. The tension of the spring 94 is exerted in opposition to the cam 96 so as to press the roller 99 against the periphery of the cam and opens the centering-bars.

The folder-shafts 100 and 101 are mounted transversely through the frame under the reciprocating-head 77, and the ends of the shafts are eccentrically recessed to receive the links 102, said links also being recessed in the reciprocating-head 77 so that when the shafts 100 and 101 are rocked the reciprocating-head 77 is moved up and down to fold the binding-metal. A connecting-rod 103 is connected to the upper ends of the crank-arms 104 and 104' fixed upon the ends of the shafts 100 and 101, and a cam-fork 105 integral with the connecting-rod slides upon the cam-shaft 36. An operating-cam 106 is fixed upon the cam-shaft and the periphery of the cam engages the roller 107 carried by the cam-fork 105. A return cam 108 is fixed upon the cam-shaft below the fork 105, the periphery of the return cam engaging the roller 109 carried by the cam-fork, so that when the cam-shaft 36 is rotated the connecting-rod 103 is reciprocated to reciprocate the crank-arms 104 and rock the shafts 100 and 101 to reciprocate the head 77. The crank-arm 104 is slotted at 104ª to engage a pin carried by the connecting rod 103 to be operated by the movement of said rod. A retractile coil-spring 110 connects the arm 111 to the frame, the tension of the spring being exerted to hold the roller 107 against the periphery of the cam 106 and to open the folder. The arm 111 is an extension of the pivot-pin which connects the connecting-rod 103 to the arm 104'. A rock-shaft 112 is mounted in bearings 113 on top of the frame carrying the folder. Arms 114 are fixed upon the shaft by set-screws, there being a spring 115 between the end of one of the arms 114 and the frame to hold the arms in their elevated position. Stripper-rods 116 are mounted vertically in the rigid folder-member 74 and connected to the arms 114 so that when the shaft 112 is rocked the strippers will kick the folded binding-metal out of the inverted V of the folder. A stop-arm 117 is adjustably fixed upon the rock-shaft to limit the movement of the shaft under expansion of the springs 115. An operating-arm 118 is adjustably fixed upon the shaft 112 with a roller 119 at its free end. A pawl 120 is pivotally mounted against the end of the arm 111, there being a stop 121 projecting from the arm 111 to limit the movement of the pawl in one direction, and the head of the pawl is rounded so that it may move by the stop in the other direction. The roller 119 is in the path of the pawl 120, said pawl vibrating by the action of the cam-shaft 36 through the connecting-rod 103, and when the pawl 120 moves forwardly the roller 119 engages the pawl and is elevated to rock the shaft 112 and kick the folded binding-metal from the inverted V of the folder, and the continued action of the machine passes the pawl 120 beyond the roller 119, and upon the return of the pawl the point of the pawl strikes against the roller and the pawl turns upon its pivot under the tension of the spring 122 and is inoperative.

The mechanism F for tilting the folded binding-metal is shown in detail in Figs. 8, 10 and 15. After the binding-metal has been centered and folded it is in the form of an inverted V, the two sides of the V being equally inclined relative to a vertical line, and it is desired to tilt this folded binding-metal so that what becomes the inner side of the binding will be vertical in order to facilitate the bending of the binding-metal around the anvil. A grooved tilting-roller 123, and a mating tongued roller 124 are mounted to run freely upon trunnions rigidly fixed in the frame in position so that the folded binding-metal passing from the folder will pass between the rollers, and the rollers are so constructed that the inner face 125 of the tongue of the roller 124 is vertical and the corresponding face of the groove 123 is vertical so that as the folded binding-metal passes between the rollers it is tilted to bring what becomes the inner side of the binding to a vertical position before the binding is brought into contact with the anvil.

The tilting rollers 123 and 124 are mounted upon rigid trunnions. A guide tube 126 is adjustably mounted by means of a set-screw in the pivoted bearing 127 secured to the frame by the screw 128. A crank-arm 129 is secured to the frame by a pivot-pin 130, and a block 131 is connected to the swinging end of the crank-arm by the crank-pin 132. The guide-tube 126 is slidingly mounted in the block 131. The guide-tube serves to guide the binding-metal from the folder to the tilting rollers, and the end of the guide-tube adjacent the folder operates in a recess 133 in the frame, said recess being larger up and down than the tube so as to allow the tube to vibrate up and down as the reciprocating head 77 of the folder vibrates.

The mechanism G for cutting the tilted binding-metal is shown in detail in Figs. 17, 18, 19 and 28. The mechanism H for reforming one end of the cut binding-metal is also shown in Figs. 17, 18, 19 and 28.

An opening 134 is formed in the frame, and a tubular guide 135 is mounted in this opening to receive the binding-metal from the tilting rollers and guide it to the cutter, said tubular guide being held adjustably in position by the arm 136 extending downwardly beside the frame and secured to the frame by a cap-screw 137. The housing comprises a base 138 secured to the frame, a standard 139 extending upwardly from the base, a cap 140 extending laterally from the standard, and a second standard 141 extending downwardly from the cap. A sliding block 142 is mounted against the inner face of the standard 141, and a slot 143 is formed horizontally through the sliding block. The reformer pivot 144 is mounted horizontally in the standards 139 and 141. The upper reformer-lever 145 is half lapped with the lower reformer-lever 146, and said levers are mounted upon the pivot 144 beside the sliding block 142 so as to fill the housing space between the standards 139 and 141. A bearing block 147 is mounted parallel with the end of the sliding block 142 and connected therewith by the arm 148. The toggle-pivot 149 is mounted horizontally through the sliding block 142 and the bearing block 147, and the toggle-links 150 and 151 connect the pivot 149 to the ends of the reformer levers 145 and 146, so that as the sliding block 142 is reciprocated the levers 145 and 146 are vibrated. The lower reformer-die 152 is fastened transversely of the end of the reformer-lever 146, and the upper reformer-die 153 is fixed transversely of the end of the reformer-lever 145. The upper die is grooved and the lower die has a tongue to fit the folded binding-metal, the tongue and groove being larger than the tongue and groove of the folder; the object being to expand one end of the folded binding-metal so that when the binding is applied to the basket the ends will overlap and fit. An ear extends upwardly from the end of the reformer-lever 145, and the cutter-blade 154 is placed beside the lever and secured to the ear by the bolt 155, said cutter-blade acting in conjunction with the end of the lower reformer-die 152 to sever the binding from the stock just before the completion of the operation of reforming the end of the binding.

The cam-fork 156 is adjustably connected to the sliding-block 142 by bolts 157 operating in slots. The cam 158 fixed upon the cam-shaft 36 has a tooth 159 to engage the roller 160 projecting downwardly from the cam-fork, said cam-fork sliding upon the cam-shaft 36 above the cam 158. A retractile coil spring 161 connects the sliding block 142 to the frame, the tension of the spring being exerted to hold the roller 160 against the periphery of the cam 158, thereby holding the reforming dies 152 and 153 separated, and then the continued operation of the machine brings the tooth 159 into contact with the roller 160 thereby reciprocating the cam-fork 156 and the sliding block 142 to straighten the toggle links 150 and 151 and operate the levers 145 and 146 to bring the reforming-dies together, thereby cutting the binding from the stock and reforming the end of the binding.

The mechanism I for guiding the cut binding-metal to the benders is shown in Figs. 22, 23, 26, and 28. A rigid guide-plate 162 is secured to the frame and has a groove 163 in its front face to receive the binding from the reformer H, said groove being shaped to fit the tilted binding; the inner side of the binding being vertical and the outer side of the binding being at an angle of about 45° relative to a vertical or horizontal line as shown in Figs. 27 and 29.

Bearings 164 and 165 are rigidly mounted upon the frame, and a rock-shaft 166 is mounted in the bearings. Crank-arms 167 and 168 are fixed upon the rock-shaft 166 beside the bearings, and the movable guide-bar 169 is attached to the outer ends of the crank-arms in position to swing down in front of the binding in the groove 163 and hold the binding in the groove as the binding moves to the benders.

An operating-arm 170 is fixed to the rock-shaft and extends upwardly, and a retractile coil-spring 171 connects the arm to the frame, the tension of the spring being exerted to swing the guide-bar 169 down to the position shown in Fig. 27 so as to guide the binding.

The cam-lever 172 is pivotally connected at one of its ends to the frame, and an adjustable connecting-rod 173 connects the swinging end of the cam-lever 172 to the crank-arm 170. A segmental cam 174 describing nearly half a circle is secured to the upper face of the cam 106, and a cam-roller 175 carried by the cam-lever 172 engages the cam 174 as the cam-shaft 36 rotates, thereby overcoming the tension of the spring 171 and operating the crank-arm 170 and the rock-shaft 166 to elevate the guide-bar 169 to the position shown in Fig. 26 so as to release the binding from the guides and permit the benders to operate. The guide-bar 169 is held elevated during the operation of the benders which requires something less than half a cycle of the machine, and the guide-bar is held depressed during the movement of the binding through the cutter and reformer which requires the remainder of the cycle of the machine.

The mechanism J in the form of a clenching anvil is shown in detail in connection with the benders in Figs. 22, 23, 24, 25 and 29, 30 and 31, and it is also shown in other figures in connection with the overlapping-mechanism, the clenching-mechanism, the punch-mechanism, and die-mechanism. The clenching anvil is square in plan and is finished to form the vertical clenching face 176 on all four sides and just above its lower face, and to form the shoulder 177 above the clenching face so as to receive the folded binding and hold the folded binding from moving upwardly, as shown for instance in Fig. 29. The anvil thus shaped is provided with hardened corners 178, said corners being dovetailed into the casting and held removably in position by screws, and the points of the corners projecting slightly beyond the clenching face 176 of the anvil.

The shoulders 177 are extended on each side of the two forward corners of the anvil, and the corners are cut away in the extensions to form the first bender-bearings 179, and at the two other corners of the anvil the shoulders are cut away to form the second bender-bearings 180.

The mechanism K for bending the binding-metal around the anvil is shown in four different steps of the operation in Figs. 22, 23, 24 and 25, and it is also shown in other figures. The bender rock-shaft 181 is mounted longitudinally of the line of travel of the binding-metal and in the frame.

A slide 182 is mounted in the frame transversely of the shaft, and a rack 183 is adjustably mounted upon the slide in mesh with the pinion 184 fixed upon the bender rock-shaft 181. A roller 185 upon the slide engages the periphery of the cam 186 upon the cam-shaft 36, said cam being mainly circular in plan, and there being an inclined cam-tooth 187 to engage the roller 185 and move the rack 183, thereby rotating the shaft 181. The retractile coil spring 188 is connected to the frame and to the slide 182 to hold the roller 185 against the cam 186 and to return the rack to its normal position after the tooth 187 has passed the roller. Segmental gears 189 and 190 are fixed upon the shaft 181. The sliding bender-frame comprises the plate 191 parallel with the shaft 181, the gear-racks 192 and 193 transversely of the ends of the plate 191 and meshing with the segmental gears 189 and 190 so that at each cycle of the machine the plate 191 is carried toward and away from the clenching anvil J.

An arm 194 extends from the rigid frame under the sliding frame and an adjustable stop 195 extends upwardly to engage the buffer 196 secured to the plate 191 to limit the backward motion of the bender-frame. The bearing-plates 197 and 198 are adjustably secured at their outer ends to the lower face of the plate 191 and at their inner ends to the inner ends of the racks 192 and 193.

The bender-links 199 and 200 are secured to the adjustable plates 197 and 198 by pivots, and fingers 201 and 202 extend outwardly from the links to engage the adjustable stops 203 and 204 to limit and adjust the movement of the links in one direction. The first bender-jaws 205 and 206 are bifurcated and pivoted to the inner ends of the links 199 and 200, there being stops 207 and 208 extending outwardly from the ends of the links to engage the jaws and limit their backward motion.

The central bending-bar 209 pivotally connects the jaws 205 and 206, the joints at the ends of the bar being in the form of hinges and the upper members of the hinges forming cams 210 and 211 to engage in the bender-bearings 179.

The pivot-pins 212 and 213 which connect the links 199 and 200 to the jaws 205 and 206 extend downwardly, and torsion springs 214, 215, are mounted upon the pins, one end of each spring being connected to the pin and the other end of the spring being connected to the corresponding jaw, the tension of the springs being exerted to hold the jaws in alinement to receive the binding.

A plate 216 is mounted above the sliding plate 191, and rollers 217 and 218 extend downwardly from the plate to engage the shoulders 219 and 220 back of the cams 210 and 211 as the bender-frame moves outwardly to its normal position; the purpose of the rollers being to straighten the jaws and hold the parts in alinement to receive the binding-metal.

Referring to Figs. 23, 24 and 25, the binding-metal passes through the tilting rollers from the folder; then through the cutter, then through the reformer, then between the rigid guide-block 162 and the movable guide-bar 169, then along the faces of the jaw 205, the central bending-bar 209, and the jaw 206; the movable guide-bar 169 being in front of the said parts 205, 209 and 206, and said parts being grooved to receive the folded binding, as shown in end elevation in Fig. 27. As soon as sufficient binding has been threaded through the bender as just described, the cutter and reformer operate to separate the binding from the stock. Yielding binding-retainers are provided to hold the binding in the benders while the benders are moving to the anvil. The binder-retainers have teeth 221 and 222 to move up in front of the binding and hold the binding in the benders as shown in Fig. 27. The teeth are formed integral with bars 223 having slots 224 and 225, and screws are inserted through the slots into the frame to slidingly mount the bars. Retractile coil-springs 226 connect the bars to the frame to hold the teeth yieldingly against the binding so that as the binding moves toward the anvil the springs will stretch.

The ends of the slots 225 adjacent to the teeth are turned upwardly to form the cams 227 so that when the cams 227 engage the corresponding screws the teeth will be moved downwardly out of engagement with the binding-metal so as to allow the binding-metal to be bent around the anvil.

The mechanism is timed to have the teeth 221 and 222 release the binding-metal just as the binding-metal is brought against the clenching anvil. Adjustable stops 228 extend outwardly from the frame to be engaged by the ends of the bars 223 to limit the outward movement of the bars under the tension of the springs 226 so as to stop the teeth 221 and 222 exactly in the right place to come in front of the binding as shown in Figs. 23 and 27. After the binding has been severed from the stock, the cam-tooth 187 contacts with the roller 185, moving the rack 183 outwardly and operating the segments 189 and 190 and moving the bender-frame toward the anvil J. When the central bending-bar 209 comes in contact with the anvil shown in Fig. 24 the cams 210 and 211 are in the bender-bearings 179. Just at this time the retaining-teeth 221 and 222 pass out of engagement with the binding, and the continued operation of the machine moving the bender-frame causes the jaws 205 and 206 to swing toward the sides of the anvil, as shown in Fig. 22, thereby bending the binding around these two of the hardened corners 178 and bringing the binding against the sides of the anvil as shown in Fig. 25. The plate 191 and the racks 192 and 193 may be formed integral as shown, or arms may extend backwardly from the ends of the plate 191, and the racks may be formed separately and attached to the arms; the only essential being that the plate 191 shall frame the racks together. Flanges extend beyond the racks to engage in the slide-ways, said slide-ways being formed by attaching the guide-plates 229 and 230 to the frame $a'$, the inner lower faces of the guide-plates being recessed so that the sliding bender-frame may slide between the guide-plates and the frame.

A pivot-shaft 231 is mounted horizontally in the frame parallel with the rock-shaft 181, and the pivoted bender-frame is mounted upon this shaft, said bender-frame comprising the rear longitudinal bar 232 and arms 233 and 234 connecting the ends of the bar 232 to the shaft 231, the operating-arm 235 extending downwardly and laterally from the arm 233, and the cam-roller 236 mounted upon a trunnion in the outer end of the arm 235 to be engaged by the tooth 237 carried by the cam 96 upon cam-shaft 36. A retractile coil spring 238 connects the arm 235 to the frame, the tension of the coil-spring being exerted to hold the pivoted bender-frame in its elevated position with the roller 236 against the lower face of the cam 96, and the tooth 237 engaging the roller 236 overcomes the tension of the spring 238 to depress the bar 232.

The rear bender-slide comprises a plate 239 mounted to slide horizontally longitudinally of the machine and crosswise of the line of travel of the forward bender-frame; the gear-rack 240 connected to the plate 239, the arm 241 extending rearwardly, and the arm 242 extending forwardly. The cam-roller 243 is mounted upon a trunnion extending upwardly from the arm 241 and engages the circular periphery of the cam 244 upon the cam-shaft 36, and the tooth 245 extending outwardly from the circular periphery so that as the cam-shaft rotates the tooth 245 engages the roller 243 to move the rear bender-slide to the right in Fig. 23; and a retractile coil spring 246 connects the slide to the frame to hold the roller 243 against the cam and return the slide to the left to its normal position.

A flange 247 extends downwardly from the cap plate 248 behind the rack 240 to form a bearing and guide for the rack, and the flange extends between the extreme end of the plate 239 and the rack to also form a bearing for the plate. A cap-plate 248 is placed on top of the slide and screwed to the frame. An idler-pinion 249 is mounted upon a trunnion secured in the frame in mesh with the rack 240. An elongated bearing 250 extends downwardly from the forward end of the arm 242, the vertical opening through said bearing being square or angular, and there being a horizontal slot 251 from the lower end of the bearing in its rear side.

The reciprocating-post 252 is square or angular and slidingly mounted in the bearing 250, there being a roller 253 upon a pin extending from the post 252 through the slot 251, said roller operating in a recess 254 in the vibrating bar 232, so that as the bar is moved up and down the post 252 is reciprocated in the bearing 250.

A pin 255 is carried by an arm extending forwardly from the upper end of the post 252, and the retractile coil spring 256 is attached to this pin. A cam 257 is carried by the upper end of the post 252, the upper face of the cam being horizontally flat. The rear bender-jaw 258 is recessed to receive the folded binding and has a cam-knuckle 259 at its forward end to engage in the corresponding bender-bearing 180; said knuckle being above the plane of the binding. The jaw 258 is upon one side of a plate having a recess 260 in its upper face, and a slotted vertical bearing 261 at its center. A shouldered screw 262 is inserted downwardly through the bearing 261 with its head in the recess 260 and screw-seated in the upper end of the post 252, the shoulder of the screw being jammed against the post so as to leave the plate free to move to the extent of the bearing 261.

A guide-pin 263 extends downwardly from the jaw to engage the vertical internal face of the cam 257, said cam face being nearly concentric to the knuckle-cam 259. The outer face of the jaw-plate is segmental in plan and concave in cross-section to form the spring-bearing 264, and the end of the spring 256 is placed in this bearing and connected to the rear end of the jaw-plate; the tension of the spring being exerted to hold the jaw in its transverse position.

A guide 265 is mounted in position to support the free outer end of the binding as it swings from its longitudinal position to its transverse position under the influence of the jaw 205, and while the binding is thus swinging the jaw 258 is depressed by the action of the pivoted bender-frame so that the binding passes above the jaw and then as soon as the binding is in position against the side of the anvil the jaw 258 is elevated, the rear slide moved by the action of the cam tooth until the jaw is brought against the binding, and the cam-knuckle 259 brought into the bender-bearing 180, and then the continued action of the cam-tooth moving the slide causes the jaw to swing against the tension of the spring 256 in a line concentric to the cam-knuckle 259, thereby folding the end of the binding against the rear side of the anvil, as shown in dotted lines in Fig. 25. The second rear bender-slide 266 is mounted to slide in the frame parallel with the first bender-slide and carries a rack 267 in mesh with the idler-pinion 249; the cap-plate 248 overlapping one edge of the slide and the cap-plate 268 overlapping the other edge of the slide. A second elongated bearing 269 extends downwardly from the inner end of the slide 266, said second bearing being identical in construction with the bearing 250. A square or angular post 270 is mounted in the bearing 269 and carries a roller 271 to operate in the recess 272 of the longitudinal bearing 232, so that as the bar vibrates up and down the post 270 is moved up and down.

An arm 273 extends outwardly from the upper end of the post 270, and a stop 274 extends upwardly from the outer end of the arm. A bender-link 275 is mounted upon the upper face of the arm 273 and secured in position by the shouldered screw 276.

A lug 277 extends from the link 275 to engage the stop 274, and a retractile coil spring 278 connects the lug to the stop, the tension of the spring being exerted to hold the lug against the stop. The jaw-carrier 279 is bifurcated and pivotally connected to the link 275, and the fourth bender-jaw 280 is mounted beside the jaw-carrier 279 and secured pivotally in position by the pin 281 at its forward end, there being a cam-knuckle 282 at its forward end corresponding to the cam-knuckle 259 to engage in the corresponding bender-bearing 180.

The free end of the jaw 280 is connected to the jaw-carrier 279 by overlapping tongues 283 so that the said free end may vibrate up and down, the jaw turning upon the pivot 281. The face of the jaw is recessed to receive the binding. A spring 284 connects the free end of the jaw 280 to the jaw-carrier 279, the tension of the spring being exerted to hold the jaw in its normal elevated position. A spring 285 connects the forward end of the jaw-carrier 279 to the opposite end of the link 270, the tension of said spring being exerted to hold the opposite end of the jaw-carrier 279 against a stop 286 upon the link 275, thereby holding the jaw 280 normally in a straight transverse line. A guide-plate 287 is secured to the link 275 to guide the end of the binding over the jaw 280, said jaw being depressed when the binding is swung against the anvil by the jaw 206.

The action of the longitudinal bar 232 depresses and raises the jaw 280 simultaneously of the depressing and raising of the jaw 258. After the binding has been swung against the anvil by the jaw 206 the jaw 280 is elevated, and then the slide 266 moving to the left brings the cam-knuckle 282 against the bearing 180, and the continued operation of the slide compresses the spring 285 and swings the jaw 280 against the rear side of the anvil as shown in dotted lines in Fig. 25. A second guide-plate 287' is secured to the cap-plate 248 to guide the extreme outer end of the binding as it is swung by the jaw 280. The extreme rear end of the jaw 280 has a cut-away portion 289. The first end of the binding is bent against the rear face of the punching-anvil by the jaw 258, and then the second end is brought into place within the first end so that the two ends overlap by the jaw 280.

The mechanism L for overlapping the ends of the binding comprises the means whereby the jaw 280 is mounted to vibrate the spring 284 for holding the vibrating end of the jaw in its normal elevated position, and the deflector-cam 290 carried by the lower end of the rear one of the clenching-levers; the cam-face being inclined as shown in Figs. 35 and 36, so that when the jaw 280 swings toward the rear face of the anvil, as shown in dotted lines in Fig. 25, the extreme end of the jaw will strike the inclined face of the cam 290 as shown in dotted lines in Fig. 36, and by said inclined face the jaw will be deflected downwardly as shown in Fig. 35 until the jaw passes the point of the cam-face, at which time the second end of the binding is under the first end of the binding, and then the tension of the spring 284 will raise the jaw vertically inside of the cam 290, thereby bringing the second end of the binding to a position within the first end of the binding, as shown in Fig. 36, and then the continued action of the machine causes the slide 266 to move backwardly, thereby withdrawing the jaw 280 lengthwise from the cam 290, and as soon as the jaw is free of the cam the spring 285 will return it to its normal position.

The mechanism M for holding the binding upon the anvil is shown in detail first in Figs. 25, 29, 30 and 32. A retaining pawl 290ª is yieldingly and pivotally mounted in position to ride over the binding and drop down behind the binding when the binding is carried against the face of the anvil by the jaw 206, so as to hold that end of the binding from being withdrawn from the other overlapping end when the slide 266 moves backwardly. In mounting the retaining pawl 290ª a plate 290ᵇ is attached to the corresponding lever 482, and the retaining-pawl 290ª is pivotally connected to an ear extending downwardly from this plate, and a retractile coil spring 290ᶜ connects the upper end of the retaining pawl to the lever, as shown in Fig. 29.

A sleeve 291 extends upwardly through the central opening 292 of the anvil J, and a plate 293 is hinged to this sleeve, said plate vibrating directly above the anvil, and the holding finger 294 extends backwardly from the plate and downwardly to press the binding against the anvil when the plate is in its lower position, said finger being raised at the time the binding is folded and the ends overlapped.

A retractile spring 295 connects to a pin below the anvil and carried therewith and extends upwardly through an opening in the anvil and through the plate 293, and is connected to the plate; the tension of the spring being exerted to hold the finger 294 in position to hold the overlapped binding upon the anvil.

A latch 296 is mounted upon a pivot above the anvil and extends downwardly through the anvil J, there being a latch-tooth 297 upon the latch to engage the arm 298 upon the plate and hold the finger 294 elevated so that the binding may be swung into place and overlapped against the anvil.

A pin 299 is recessed upon one side and mounted horizontally in position to engage the latch-tooth 297 and extend beyond the rear face of the anvil, said pin being held in place and allowed to reciprocate by the screw 300 screw-seated in the anvil with its point in the recess of the pin so that when the jaw 258 bends the binding against the anvil the jaw will strike the pin 299 and press the lower end of the latch inwardly to disengage the tooth 297 from the arm 298 and allow the finger 294 to be pulled downwardly by the spring 295 and grip and hold the binding in place. This operation takes place before the second end of the binding is brought into place, the object being to hold the first end of the binding securely while the second end of the binding is brought up into the first end. A retractile coil spring 301 connected to the upper end of the latch 296 above the pivot holds the latch-tooth 297 yieldingly in engagement with the arm 298.

The completed binding is shown in plan in Fig. 32 and held upon the anvil ready to be applied to the body-material. In bending the binding around the anvil the corners 178 are vertical to receive the binding, and the two sides of the binding are bent together at the corners only leaving the edges of the folded binding open between the corners so that the edges of the body-material may be inserted.

The mechanism N in the form of magazines for holding the stock of body-material, is shown in Figs. 1, 2, 5, 37, 38, 39, 40, 41, 42, and is omitted from Fig. 3. There are two magazines each comprising a base 302, a rear wall 303, end walls 304, 305 extending forward from the rear wall and forming a vertical chute 306 to receive the body-material 307; the three walls of the magazine being preferably of boards framed together by the lower brace 308 and the upper brace 309, said braces being in the form of angle-iron in cross-section as shown in Fig. 41, and U-shaped in plan as shown in Fig. 39. The magazines thus constructed are portable so that they may be removed from the magazine-mechanism and filled and then replaced.

The screw-supporting posts 310 and 311 extend upwardly from the center of the forward side of the base 302, the upper ends of the posts being connected by the feed-screw bearing 312, and the feed-screw 313 is mounted vertically with its upper end in the bearings 312, the body of the screw being between the posts 310 and 311, and the point of the screw in a supporting bearing in the base 302, and there being a crank-handle 313' for manually operating the screw.

Arms 314 and 315 extend in opposite directions outwardly from the upper ends of the posts 310 and 311 and then backwardly to the edges of the side walls 304 and 305, and supporting pins 316 and 317 are fixed in these arms and project outwardly in alinement. The bases 302 must be rigidly secured either to the floor or to the main base of the machine, preferably the latter as shown in Fig. 5. Cleats 304' and 305' are secured horizontally to the lower ends and inner faces of the sides 304 and 305 to form a bottom for the magazine and hold the shooks when the magazine is removed from the frame or when the magazine is being filled in its removed position.

Notches are formed in the lower edges and forward ends of the brace 309 to hook over the pins 316 and 317 to secure the upper end of the magazine to the posts 310 and 311. Pins 318 and 319 project outwardly from the ends of the base 302, and teeth 320 and 321 project downwardly from the brace 308 between the pins 318 and 319 to secure the lower end of the magazine to the base so that by raising the magazine bodily to disengage the teeth 320 and 321 from the pins 318 and 319 and disengage the brace 309 from the pins 316 and 317 the magazine is disconnected from the magazine-mechanism.

The mechanism O for feeding the body-material into position to be picked from the magazines, is shown in connection with the magazines.

The magazine bottom 322 has rollers 323 to engage the front or inner faces of the posts 310 and 311, and an arm 324 extends from the bottom between the posts and carries rollers 325 to engage the back or outer sides of the posts; the rollers 323 being at the lower face of the bottom plate and the rollers 325 being in a plane considerably above the bottom plate, so that pressure downwardly upon the bottom will not cramp the rollers upon the posts as would be the case if the rollers were in the same horizontal plane so that the bottom 322 may travel freely up and down the posts.

A split nut consisting of the jaws 326 and 327 operates upon the screw 313. The jaws 326 and 327 are formed integral with the levers mounted upon pivots 328 and 329, the ends of the levers opposite the jaws serving as handles projecting beyond the outer faces of the posts for manual operation, and a spring 330 is inserted between these handles to hold the jaws of the two parts of the nut in engagement with the screw. When it is desired to manually shift the bottom 322 up or down in the magazine, the the handles 331 and 332 are manually grasped to compress the spring 330 and open the jaws 326 and 327 to release the jaws from the screw. Then the bottom may be readily moved up and down to the desired position, the handles released and the jaws will again clutch the screw.

When the magazine has been filled with the body-material 307 it is placed in position with the bottom 322 under the body-material. In other words, the bottom 322 is first lowered to the base 302, and then the magazine is placed in position with the body-material resting upon the bottom 322. The body-material 307 is in the form of thin wooden slabs commonly called shooks. The screw 313 passes freely through the arm 324.

There are two of the magazines N set in relation to the machine, as shown in Fig. 5 and upon an enlarged scale in Fig. 37, the magazines being so located upon the floor that the shooks may be readily picked from the magazines and placed in the dies, and the magazines being located directly upon the floor instead of upon a base so that they will be of considerable height, capable of receiving a considerable stock of the body-material.

In order to distinguish one magazine from the other I designate in Fig. 37 the forward magazine as N and the rear magazine as N', it being understood that the magazine constructions are identical and that they are distinguished as to location. An operating-shaft 333 is mounted in brackets secured to the posts of the magazine N, and a similar operating-shaft 334 is mounted in brackets secured to the posts of the magazine N'. A crank-arm 335 is fixed upon the shaft 333, and a similar crank-arm 336 is fixed upon the shaft 334, said crank-arms being parallel and connected by an adjustable connecting-rod 337.

A crank-arm 338 is fixed upon the shaft 334, and a slotted bolt 339 is rotatably mounted vertically through the outer end of this crank-arm. A sleeve 340 is pivotally mounted in the slot of the bolt 339 upon two set-screws 341, and the reciprocating transmission rod 342 is slidingly mounted in the sleeve 340, there being set-collars 343 and 344 upon the transmission-rod 342 upon each side of the sleeve 340, so that as the rod 342 reciprocates the collars will alternately strike the ends of the sleeve, thereby operating the crank-arm 338 to rock the shaft 334, and through the crank-arms and connecting-rod 337 correspondingly rock the shaft 333. The set-collars 343 and 344 are set some distance apart so as to cause lost motion between the reciprocating transmission-rod 342 and the sleeve 340, and this lost motion may be increased or decreased by adjusting the set-collars.

A crank-arm 345 is fixed upon the upper end of the shaft 334. An eye-bolt 346 is rotatably mounted in the end of the crank-arm, and the feed-bar 347 is bifurcated and pivotally mounted upon the head of the eye-bolt with a pin through the eye of the bolt, and the other end of the feed-bar is slidingly mounted in the slotted post 348, the slot in the post extending to the top of the post so as to allow the feed-bar to vibrate up and down as well as to slide longitudinally.

A ratchet wheel 349 is fixed horizontally upon the upper end of the screw 313 with an annular series of ratchet teeth in its upper face, and a pawl 350 is vertically mounted through the feed-bar 347 near its center and held adjustably in position by a set-screw 351', the point of said pawl being normally in engagement with the teeth of the ratchet-wheel 349.

A throw-off pin 351 is slidingly mounted vertically in the upper end of the post 311 with a finger 352 extending into position to engage upon the upper face of the upper one of the shooks 307 as shown in Fig. 42, so that as the shooks are raised by the operation of the screw 313 moving the follower bottom 322 upwardly the finger 352 will be raised to raise the throw-off pin 351 to engage under the feed-bar 347 and raise the feed-bar in the post 348 to raise the pawl 350 out of engagement with the ratchet-wheel 349 and stop the operation of the feed-screw.

The mechanism P for picking the body-material from the magazines is shown in Figs. 1, 2, 3, 5, 37, 38, 45, 46 and 47. Referring first to Figs. 1, 2 and 3, a lower arm extends diagonally from the frame, and the lower pair of bearings 353 is carried by the outer end of the arm, and in a similar manner an upper arm extends from the frame and carries in its outer end the upper pair of bearings 354. The tubular picker-shafts 355 and 356 are rotatably and slidably mounted in these bearings. A pair of ears 357 extends from the bearings 353, and a bell-crank-lever 358 is pivotally mounted between the ears, one end of the lever being horizontal and the other end of the lever being vertical. Rollers 359 and 360 are mounted upon trunnions projecting horizontally from opposite sides of the free end of the horizontal member of the lever 358 between the tubular shafts 355 and 356, and sleeves are fixed upon the shafts adjacent the rollers, and segmental lugs 361 and 362 project inwardly from the shafts and ride upon the rollers so as to support the shafts. A cam is fixed upon a drum 401 and comprises two oppositely-arranged concentric cam-surfaces 363 and 364, there being retreating notches 365 and 366 between the ends of these cam-surfaces, and a cam-fork 367 is mounted to reciprocate above the cams 363 and 364, there being a cam-roller 368 mounted on a trunnion extending downwardly from the fork to engage the cam-surfaces, and an adjustable connecting-rod 369 connects the cam-fork 367 to the lower end of the bell-crank-lever 358 by a ball-and-socket joint, so that as the drum 401 rotates, the roller 368 riding upon the cam-surface 363 will elevate the tubular picker-shafts 355 and 356, and as the roller reaches the notch 365 and retreats into the notch the shafts 355 and 356 are lowered, and then as the roller rides upon the cam-surface 364 the shafts are again raised until the roller reaches the notch 366 where the shafts are again lowered, thereby making the shafts go up and down twice during each cycle of the machine.

The upper ends of the shafts 355 and 356 are in the form of elbows, and tubular arms 370 and 371 are adjustably connected to these elbows and held by jam-nuts. A picker-plate 372 is rigidly secured to the outer end of the tubular arm 370, and the fingers 373 and 374 are formed integral and transversely of the ends of the plate, there being suckers 375 extending downwardly from the plate between the fingers. In a similar manner the picker-plate 376 is rigidly connected to the outer end of the arm 371, fingers 377 being formed integral with and transversely of the ends of the plate 376, and suckers 378 project downwardly from the plate between the fingers.

The details of the picker-plates and suckers are shown in Figs. 47 and 48. Each picker-plate is provided with an air-chamber 379 communicating with the tubular arm, and vertical bores 380 are formed through the plate communicating with the chamber. The lower end of each bore is countersunk to receive the inverted cup-shaped rubber-suckers 375 or 378, and bolts 381 are inserted upwardly through the bores 380; said bolts having heads to fit the shape of the suckers and hold the suckers in place, and there being nuts upon the upper ends of the bolts to adjust the tension upon the suckers; and small passages 380' lead upwardly at the centers of the bolts and then laterally into the air-chamber 379. The two picker-plates are constructed substantially alike, the only difference being the point at which the plate is attached to the arm. Segmental gears 382 and 383 are fixed upon the lower ends of the shafts 355 and 356 and mesh together so as to connect the shafts together. A crank-arm 384 extends outwardly from the gear 382, and an eye-bolt 385 is rotatably mounted vertically through the outer end of the crank-arm, and a connecting-rod 386 is slidingly mounted through the eye of the bolt, there being expansive coil-springs 387 and 388, one upon each side of the eye-bolt. A knuckle-joint 389 connects the reciprocating transmission rod 342 to the end of the connecting-rod 386, said knuckle-joint forming a shoulder against which the spring 388 presses in opposition to the eye-bolt, and a set-collar 390 is adjustably mounted upon the connecting-rod to form a shoulder against which the spring 387 presses in opposition to the eye-bolt.

Referring to Figs. 38, 59, 60 and 61, a stud-shaft 391 is mounted vertically in and extends downwardly from the frame a, said shaft having a jam-sleeve 392 against the frame, a washer 393 against the sleeve, a head 394 against the washer, a nut 395 upon its upper end to tighten the head against the washer, and sleeve to hold the shaft rigid. A gear 396 is mounted upon the sleeve in mesh with the helical toothed gear 37. A driving member 397 of an intermittent gear combination is mounted upon the sleeve below the gear 396, and adjustably connected to the gear 396 by cap-screws 398 extending downwardly through slots in the gear 396 and tapped into driving member 397. The hollow cam 399 having the zigzag peripheral cam-face 400 has an internal flange inserted upwardly against the lower face of the driving member 397. The drum 401 has an external flange inserted upwardly against the internal flange of the cam, and a ring 402 is inserted around the drum 401 against its external flange, the whole held adjustably together by bolts 403 inserted upwardly through the ring and through slots in the internal flange of the cam 399 and tapped into the driving-member 397, so that by loosening the bolts the drum 401 may be rotatably adjusted and the cam 399 may be adjusted to the extent of the slots 404 in the internal flange. A crank-block 405 is dove-tailed into the lower end of the drum 401 and held adjustably in place by set-screws 406, and the crank-pin 407 is fixed in one end of the block; one end of the connecting-rod 386 being mounted upon this crank-pin, so that as the driving-shaft 10 is operated the worm 38 will drive the helical toothed gear 37, thereby driving the gear 396 and the driving-member 397, thereby rotating the drum 401 and operating the crank-pin 407 to reciprocate the connecting-rod 386 to operate the crank-arm 384 and rock the picker-shafts 355 and 356; and the rotation of the drum 401 operates the cam-fork 367 and the connecting-rod 369 to raise and lower the picker-shafts and through the picker-shafts the picker-plates 372 and 376.

Stop-arms 408 and 409 are adjustably fixed upon the lower ends of the picker-shafts 355 and 356, and the adjustable contacts 410 are carried by the outer ends of the stop-arms, said contacts consisting of bolts screw-threaded horizontally through the ends of the arms and held adjustably in place by jam-nuts. A retractile coil-spring 411 connects the stop-arms together, and the stop-arms are so arranged that when the connecting rod 386 moves outwardly the point of the stop-arm 408 engages the head of the stop-arm 409 and limits the rotation of the picker-shafts in that direction, and so that when the connecting-rod moves in the other direction the point of the stop-arm 409 engages the head of the stop-arm 408 to limit the rotation of the picker-shafts in that direction, and when the stops 408 and 409 strike, the springs upon the connecting-rod upon each side of the bolt 385 yield to the continued action of the connecting-rod.

The spring 411 prevents back-lash and rattling in the segmental gears 382 and 383. Pipe-nipples 412 and 413 are fixed in the lower ends of the tubular picker-shafts 355 and 356, and flexible pipes 414 and 415 are attached to the lower ends of these nipples. A bracket 416 is attached to the frame a as shown in Fig. 37. A valve-casing-nipple 417 is placed against this bracket, and a coupling-member 418 is inserted through the bracket and tapped into the valve-casing; the head of the coupling-member engaging the opposite side of the bracket so that by screwing the coupling-member tight the valve-casing is held rigid with the bracket, as shown in Figs. 45 and 46.

A pipe-nipple 419 is tapped into one member 420 of the valve-casing. A three-way elbow 421 is screwed upon the pipe-nipple 419. A nipple 422 leads from one arm of the elbow and is connected to the flexible pipe 415, and a nipple 423 leads from the other arm of the elbow and is connected to the flexible pipe 414. The valve-casing 424 has three connections 417, 420 and 425, the pipe 426 leading from the member 425 to the suction-pump. The valve 427 is mounted vertically in the valve-casing 424 and has a straight passage 428 adapted to line up with the passage from the nipple 419 to the pipe 426. as shown in Fig. 45, and a side passage 429 adapted to connect the nipple 419 to the coupling 418, as shown in Fig. 46. A crank-arm 430 extends laterally from the upper end of the valve 427, and a connecting-rod 431 is adjustably connected to the outer end of the crank-arm, the crank-pin being adjustably mounted in a slot in the crank-arm. The cam-fork 432 is mounted to slide upon the drum 401 and carries a cam-roller 433 upon its upper face. A retractile coil spring 434 connects the cam-fork to the frame to hold the fork yieldingly against the drum.

The valve-operating-cam 435 is curved to fit the drum 401, and is connected to the drum by bolts 436 inserted through flanges and tapped into the drum, the periphery of the cam 435 engaging the roller 433 to reciprocate the connecting-rod 431 to operate the crank-arm 430 to operate the valve 427 to exhaust the pressure, as shown in Fig. 46; the spring 434 serving to return the valve to its normal position to connect with the suction-pump, as shown in Fig. 45.

When the cam-roller 368 passes into the retreating notches 366 the picker-plates 372 and 376 have been moved by the connecting-rod 386 into position to drop into the magazines, as shown in Fig. 37, and the continued operation of the machine allowing the roller 368 to pass into the retreating notches 366 allows the picker-shafts 355 and 356 to slide downwardly by the gravity of the parts until the suckers 375 and 378 are upon the faces of the shooks. Then the cam 435 passes the roller 433, the spring 434 operates the valves 427 to connect with the suction-pump, thereby causing the suckers to take hold of the shooks. Then the continued operation of the drum 401 brings the cam-surface 363 into engagement with the roller 368, thereby sliding the picker-shafts upwardly to pick the shooks from the magazine. Then the continued operation of the drum 401 carrying the crank-pin 407 operates the connecting-rod 386 to operate the crank-arm 384 and rock the picker-shafts 355 and 356 in their bearings to carry the shooks to the dies, as shown in dotted lines in Fig. 37. Then the continued operation of the drum 401 causes the roller 368 to pass into the retreating-notch 365, thereby lowering the picker-plate carrying the shooks into the dies, and the cam 435 engages the roller 433 to operate the valve 427 to exhaust the vacuum and release the shooks. Then the cam 364 engages the roller 368 to elevate the picker-plates from the dies, the crank-pin 407 operates the connecting-rod 386 to rock the picker-shafts and return the picker-plates to the magazines, and this operation is continued at each cycle of the machine.

The mechanism Q in the form of dies for forming the boxes is shown in Figs. 1, 2, 3, 5, 37 and 38. A shaft 437 is mounted vertically in the frame a and carries a four-way intermittent spur-gear 438 upon its lower end in mesh with the intermittent driver 397. A die-carrier 439 is fixed upon the upper end of the shaft above the frame and rests upon ball-bearings 440. Four dies 441 are carried by the die-carrier 439, said dies being arranged in the form of a square equal distances from the shaft 437 and equal distances apart, and the vertical openings in the dies being of the size and shape of the proposed box. Spring-fingers 442 extend upwardly at the four sides of each die to engage the ends of the shooks to centralize the shooks relative to the die and to snap over the ends of the shooks and hold them in the die while the picker-plate is retreating; and similar spring-fingers 443 project upwardly adjacent the fingers 442 to engage the side edges of the shooks and assist in holding and registering the shooks.

The mechanism R for operating the pickers to place the body material in the dies has already been described, and consists of the rotating-drum 401 and the connections from the drum to the pickers through the connecting-rods 369 and 386 and the connection to the suction-pump.

The mechanism S in the form of a punch to coöperate with the dies for forming the boxes is shown in detail in Figs. 1, 49, 50, 51, 52, 53, 54, 55, 56, 57 and 58. A slide-way is formed in the frame a to receive the punch-slide 444, said slide being provided with a gib 445 and being held in place by caps 446 and 447. A socket 448 extends from the slide between the caps 446 and 447, and the free end of the lever 449 extends into this socket, said lever being connected to the frame at its other end by the pivot 450.

The cam-wheel 451 is fixed upon the upper end of the cam-shaft 36, and a cam-roller 452 is mounted upon a trunnion extending from the central portion of the lever 449 and is operated by the cam 451 so that as the cam-shaft rotates the lever 449 is vibrated to move the slide 444 up and down. A tubular neck 453 extends downwardly from the slide 444 and the punch-shank 454 is removably mounted in this tubular neck by set-screws 455. The lower part of the punch-shank 454 is made tubular by the bore 456 to receive the expansive coil-spring 457. A second punch-shank 458 is slidingly mounted in the lower end of the bore 456 against the spring, and a pin 459 is fixed in this second shank with its ends extending into slots 460 in the first shank so as to allow the second shank to slide up and down to the extent of the slots 460; the pressure of the spring 457 being exerted to hold the second shank in its lower position, as shown in Fig. 53.

A sleeve 461 is slidingly mounted upon the shank 454 below the lower end of the neck 453, there being an internal shoulder 462 upon the sleeve to engage the external shoulder 463 upon the shank to limit the downward motion of the sleeve, and there being a spring-seat 464 around the periphery of the sleeve to receive the expansive coil-spring 465. A spanner-nut 466 is screw-seated in the lower end of the sleeve 461 below the shoulder 463 to form a bearing between the lower end of the sleeve and the lower end of the shank. The clencher-head 467 is fixed upon the upper end of the shank below the tubular neck 453 and forms a seat for the upper end of the spring 465.

The sleeve 291 is slidingly mounted upon the extreme lower end of the shank 454. The sleeve 291 is formed integral with and projects upwardly from the anvil-supporting plate 468, and the vertical key 469 is inserted to hold the sleeve 291 against rotation upon the shank. Posts 470 and 471 are inserted downwardly through the anvil and adjustably screw-seated in the plate 468 at diagonally opposite corners, there being a shoulder 472 upon each post to engage upon the anvil J so that when the posts are screwed down tight the anvil is held securely to the plate. Expansive coil-springs 473 and 474 are mounted upon the posts, and nuts 475 and 476 are fixed upon the upper ends of the posts to form seats for the upper ends of the springs.

An adjustable stop 477 is screw-seated in the frame a and held adjustably in position by the set-screw 478, the lower end of the stop being in position to engage the upper end of the post 471 and limit its upward movement. A similar post 479 is screw-seated in the bearing 479′ carried by the cap 446 and held adjustably in position by a jam nut 480, the lower end of the stop being in position to engage the upper end of the post 470 and limit its upward movement.

The plunger-base 481 is formed integral with the lower end of the sleeve 461 and forms a seat for the lower ends of the springs 473 and 474, the tension of the springs being exerted to hold the anvil in its elevated position, as shown in Fig. 53. The four levers 482 are mounted upon pivots 483 between ears extending from the plunger-base 481, and the hardened plunger-hammers 484 are carried by the lower ends of the levers 482 in position to engage and clench the binding upon the edge of the box. Links 485 connect the upper ends of the levers 482 to the clencher-head 467 so that as the clencher-base slides upwardly relative to the head the upper ends of the levers are thrown outwardly to bring the hammers 484 against the binding, as shown in Fig. 55.

The point of the punch is formed by a square plate 486 the size of the inside dimension of the bottom of the box to be formed, and a wall 487 extends upwardly from the edges of the plate. The lower end of the second punch-shank 458 is reduced in size and tapered to fit tightly in a vertical opening in the center of the plate 486, and a key 488 is inserted to hold the plate against rotation, and a screw 489 is inserted upwardly through the plate 486 into the second shank to hold the plate securely in position upon the shank.

Pivot-blocks 490 are secured to the corners of the anvil-supporting-plate 468 by means of screws, there being two pivot-blocks at each corner, and adjustable guide-plates 491 are mounted upon the pivots 492 extending from the pivot-blocks, there being a guide-plate for each of the four sides of the box. An opening 493 is bored into each side of the anvil-supporting-plate 468.

An adjustable spring-seat 494 is formed at the bottom of each opening by inserting a screw, and an expansive coil-spring 495 is placed in the opening between the spring-seat 494 and the guide-plate, said spring being above the pivot so as to force the upper edge of the guide-plate outwardly.

An opening 496 is formed through the guide-plate for the insertion of a screw-driver for the adjustment of the spring-seat 494, said opening being smaller than the spring. A stop-bearing 497 is formed adjacent to the spring by extending the guide-plate inwardly and recessing its outer face, and a stop-screw 498 is inserted through the guide-plate and screw-seated in the plate 468 with its head in the recess so as to adjust and limit the outward swing of the upper edge of the guide-plate; the object being to locate the guide-plates so that they will guide the upper edges of the shooks into the open binding, as shown in Figs. 54 and 55. Cap-screws 499 connect the anvil to the supporting-plate 468, said cap-screws being arranged at diagonal corners, as shown in Fig. 57.

The shooks are laid crosswise in the dies by the pickers, and at each operation of the pickers the dies are moved one step or a quarter-turn by the intermittent-gear mechanism, so that the die containing the two cross shooks is by the next step carried under the punch, as shown in Fig. 52. Then the continued operation of the machine places the binding upon the anvil, and then moves the slide 444 downwardly until the punch-plate 486 presses the shooks downwardly into the die and turns the ends of the shooks upwardly to form the sides of the box, as shown in Fig. 54.

The mechanism T for moving the dies carrying the body-material to the punch has already been described, and comprises the intermittent-gear-mechanism including the driver 397 and the step-by-step gear 438.

The mechanism U forming the clenchers for the anvil has already been described and comprises levers 482 carrying the hammers 484 and the coöperating parts by which the hammers are operated against the binding.

The mechanism V for moving the clenchers into operative position is described in connection with the punch-mechanism, and comprises the clencher-base 481 carried by the punch-mechanism and coöperating parts.

The mechanism W for initially operating the punch comprises the stops 477 and 479 and the coöperating parts by which the punch is prepared by its up-stroke for receiving the binding and getting ready to descend to form the box.

The mechanism X for moving the punch into the die to form the box includes the cam 451 upon the cam-shaft 36 and the connections between this cam and the punch-slide.

The mechanism Y for guiding the edges of the body-material between the edges of the folded open binding-metal includes the guide-plates 491 and the adjustments therefor.

The mechanism Z for registering or evening the ends of the body-material is shown in the lower parts of Figs. 52, 54 and 55.

A square plate 500 is held in elevated position relative to the frame $a$ by brackets 501 and 502. A square hinge-plate 503 is mounted upon the plate 500 with a sleeve 504 extending downwardly through the center of the plate 500 and a nut 505 upon its lower end to hold the parts together. Wings 506 are hinged to the four edges of the plate 503, and springs 507 are inserted between the wings and the plate 500 to hold the wings normally elevated. The wings 506 and the plate 503 form a separable bottom or member for the dies as they are successively presented under the punch to form the box body. A rubber sucker 508 is placed upon the plate 503 and extending over the hinge-pins onto the wings 506, and the tubular bolt 509 has a flat head and is inserted downwardly through the sleeve 504 with the head upon the sucker 508, and a nut 510 upon the lower end of this tubular bolt. holds the parts in place. A pipe-elbow 511 is tapped into the lower end of the tubular bolt 509, and the vacuum-pipe 512 leads to the bracket 513 secured to the frame and through the bracket connects to the three-way valve-casing 514, and a pipe 515 leads from the three-way valve to the suction-pump. The three-way valve-casing 514 is similar in every essential to the valve-casing 424. An arm 516 extends from the bracket 513. A connecting-rod 517 is connected to the arm of the valve 518, and a link 519 connects the arm 516 to the connecting-rod 517 to produce a toggle-joint, and a cam-roller 520 carried by the link 519 engages the cam 521 carried by the drum 401. A retractile coil-spring 522 connects the pivot-pin carried by the arm 516 to the connecting-rod 517, the tension of the spring being exerted to hold the roller 520 against the periphery of the drum and against the periphery of the cam 521. When the roller 520 is against the periphery of the drum the valve 518 is in position to exhaust the vacuum, and when the roller 520 is against the periphery of the cam 521 the valve is in line with the suction-pump and operates the vacuum under the punch-plate 486, causing the sucker 508 to stick to the bottom of the box and hold the box in the die while the punch-plate is being withdrawn.

The punch-mechanism presses the bottom of the box down upon the wings 506, and the continued action brings the binding down upon the upturned edges of the shooks; and if one of the edges is higher than the other edges the corresponding wing 506 will yield so that when the box is pressed firmly into the open binding the upper edges will be registered, and when the binding is clenched tightly upon the edges they will be held in registration.

The mechanism $Z^1$ for operating the clenchers to set the binding-metal upon the edges of the body-material has already been described and includes the links 485 operated by the descending motion of the punch-slide.

The mechanism $Z^2$ for stripping the box from the punch is shown in Figs. 62, 63, 64, 65, 66, 67, this mechanism being omitted from Figs. 52, 53 and 55.

The stripper base-plate 523 is secured against the lower face of the frame $a$ by cap-screws 524, said plate having a central opening through which the punch-mechanism operates. At each of the four corners of the plate 523 is a vertical bearing 525 registering with an opening 526 through the frame $a$. Tubular sleeves 527 are inserted upwardly into the bearings 525 and held removably in position by set-screws 528. The lower ends of the sleeves are transversely slotted upon one side to form the pawl-openings 529. Bearing-blocks 530 are adjustably mounted upon the sleeves 527 by set-screws 531, and the pawl-bearings 532 extend outwardly from the bearing-blocks; said bearings being bifurcated to receive the pawl-levers 533, said levers being held in place by pins 534, so that the pawl-teeth 535 pass into the slots 529. Retractile coil-springs 536 connect the pawl-levers 533 to the lower ends of the sleeves 527 so as to pull the pawl-teeth 535 into the slots 529. The levers 533 are connected together in pairs by the shafts 537 and 538, and rollers 539 and 540 are fixed upon the shafts in position to engage the corresponding clenching-levers 482 when the punch is being withdrawn from the box. An endwise reciprocating stripper-rod 541 is mounted in each sleeve 527. A bearing-block 542 is secured in a plane across each corner of the anvil against the lower face of the bearings supporting the clenching levers, as shown in Fig. 66; and the lower ends of the stripper rods 541 are slidingly mounted in these bearing-blocks 542, there being a V-shaped vertical recess 543 in each of the stripper-rods to fit the corners of the anvil.

A pin 544 is inserted into the clencher-lever-bearing, one for each stripper-rod 541, and a similar pin 545 is fixed in the lower end of the stripper-rod below the bearing-block 542. A retractile coil-spring 546 connects the pins 544 and 545 together, the tension of the spring being exerted to move the stripper-rod upwardly. The lower ends of the stripper-rods 541 are in position to engage the corners of the binding, and when the punch-plate moves downwardly into the die to form the box the bearing-blocks 542 engage the pins 545 and move the stripper-rods 541 downwardly into engagement with the corners of the binding. Then the pawl-teeth 535 snap inwardly above the upper ends of the stripper-rods and hold the stripper-rods down upon the corners of the binding. At this time the rollers 539 and 540 are out of engagement with the clencher-levers, as shown in Fig. 64. Then as the punch-slide is operated to retreat the punching-mechanism and its coöperating parts to withdraw the punch from the box the stripper-rods are held rigidly against the corners of the binding until the punch retreats, thereby stripping the box from the punch; and then the continued action of retreating the punch brings the clenching-levers into engagement with the rollers 539 and 540, as shown in Fig. 65, and the cam action of the rollers upon the clenching-levers forces the pawl-teeth 535 out of engagement with the stripping-rods 541 and the springs 546 snap the stripper-rods upwardly into their normal positions.

The mechanism Z³ for holding the box in the die while the punch is withdrawn has already been described, and consists of the suckers 508 and the coöperating parts. This mechanism is not to serve as a stripping-mechanism, but is to serve to hold the box from rebounding out of the die after the punch has been withdrawn.

The construction of the link-connection between the clencher-head 467 and the clencher-levers 482 is well shown in Fig. 55. A circular bearing 547 is formed parallel with the face 548 of the clencher-head 467, and said bearing is open for one-fourth of its circumference, said opening 549 extending from a horizontal line with the top of the bearing downwardly, and a similar circular bearing 550 is formed in the upper end of the clencher-lever; said bearing 550 having an opening 551 extending from a horizontal line upwardly. A roller 552 is mounted in the bearing 547, and a similar roller 553 is mounted in the bearing 550; said rollers being inserted endwise, and flat bars are grooved into the rollers to connect the rollers and form links 485.

The mechanism Z⁴ for discharging the completed box from the machine and placing the box in a stack in a chute, is shown in detail in Figs. 67, 68 and 69. A bracket 554 is secured to the frame a at a point in front of the bearing of the shaft 437, and a supporting-plate 555 is formed integral with the outer upper end of the bracket, said plate being substantially on a level with the die-carrier 439. The chute 556 is secured to the supporting-plate 555 at its receiving end, and the other end may be supported in any suitable way, not shown. A bearing 557 is formed in the end of the bracket near the plate 555, and a rock-shaft 558 is mounted in the bearing. The ejector-arm 559 is mounted upon the rock-shaft 558 and an operating-arm 560 is carried by the ejector-arm. The cam-lever 561 is pivotally mounted upon the pin 562 in the bracket 513 extending downwardly from the frame a, and a stud-shaft 564 fixed in the central portion of the lever 561 carries a cam-roller 565 to engage the cam 400. A connecting-rod 566 connects the free end of the cam-lever 561 to the free end of the operating-arm 56 so that as the gear 397 rotates to rotate the cam 399 the lever 561 is vibrated up and down to rock the shaft 558 a quarter turn. A foot 567 is carried by the ejector-arm 559 to engage the bottom of the box. A guide-plate 568 extends backwardly from the bottom of the chute 556, and a second guide-plate 569 is connected to the sides 570 and 571 of the chute so as to form an elbow-shaped opening for the receiving end of the chute, and the parts are so located and timed that when the completed box is moved from the punch-mechanism by one step of the die carrying the box the die and box pass into position below the elbow-shaped receiving end of the chute, and the continued operation of the parts causes the foot 567 to pass upwardly against the bottom of the box in the die, thereby ejecting the box from the die and passing the box upwardly through the elbow-shaped entrance to a vertical position in the stack in the chute; the beginning of the operation being shown in Fig. 68 and the completion of the operation being shown in Fig. 69.

During the passage of the box from the die to the chute the box passes between the guide-plates 568 and 569 and the upper edge 572 of the guide-plate 569 is free and elastic so as to snap down behind the rim of the box and hold the last box in the chute from falling back. The guide-plate 568 is curved so as to hold the lower side of the box in position in the chute.

The zigzag peripheral cam-face 400 is a winding-groove in the periphery of the hollow cam 399, there being a low point 573 and a high point 574, and an abrupt receding line 575 connecting the high point with the low point and serving as a return. The cam-roller operates in the grooves so that the lever is moved positively both ways by the groove. A guide-plate 576 is attached to the side of the chute in horizontal position with an upturned edge 577 so as to hold the box down in the die as it passes under the receiving end of the chute.

The operation has already been described in connection with the details.

Many changes may be made in the arrangement of parts and the details of construction without departing from the spirit of my invention.

I claim:

1. In a box-making machine, the combination of means for supporting a binding metal, means for feeding the binding metal, means for bending the binding metal lengthwise, transverse bending mechanism, cutting means for cutting the binding metal transversely after being held by a part of the transverse bending mechanism, a support for the binding metal forming a part of the means whereby the binding metal may be bent and held about the same, means including punch and die mechanism for forming box material into a box body, means for feeding the box material, means for applying the bent binding metal to the box body, the die of said punch and die mechanism serving to carry the completed boxes away from the punch, and means for automatically ejecting the boxes from the carrying means and nesting the same.

2. In a box-making machine, the combination of means for supporting a binding metal, means for feeding the binding metal, means for bending the binding metal lengthwise, transverse bending mechanism, cutting means for cutting the binding metal transversely, a support for the binding metal forming a part of the means whereby the binding metal may be bent and held about the same, means including punch and die mechanism for forming box material into a box body, means for feeding the box material, means for applying the bent binding metal to the box body, means for stripping the completed boxes to adapt them to be carried away from the punch, and means for automatically ejecting the boxes.

3. In a box-making machine, the combination of means for supporting a binding metal, means for feeding the binding metal as a single strip from stock, means for bending the metal lengthwise, transverse bending mechanism, cutting means for cutting the binding metal transversely after being held by a part of the bending mechanism, supporting means for the binding metal forming a part of the means whereby the binding metal may be bent and held about the same, means for forming box material into a box body, means for feeding box material, means for applying the bent binding metal to the box body, and automatic ejecting means.

4. In a box-making machine, the combination of means for feeding a binding metal, means for bending the binding metal lengthwise, transverse bending mechanism, cutting means for cutting the binding metal transversely, supporting means for the binding metal forming a part of the means whereby the binding metal may be bent and held about the same, and means for forming box material into a box body.

5. In a box-making machine, the combination of means for supporting a binding metal, means for bending the binding metal, means for bending the binding metal lengthwise, transverse bending mechanism, cutting means for cutting the binding metal transversely, supporting means for the binding metal forming a part of the means whereby the binding metal may be bent and held about the same, means including punch and die mechanism for forming box material into a box body, means for feeding the box material, means for applying the bent binding metal to the box body, said die mechanism forming means for carrying the box material crosswise adjacent to the punch and the completed boxes away from the punch, and means for automatically ejecting the boxes from the carrying means.

6. In a box-making machine, the combination of means for supporting and feeding a binding metal as a strip, means for bending the binding metal lengthwise, transverse bending mechanism, cutting means for cutting the binding metal transversely after being held by a part of the bending mechanism, means for reforming the binding metal to adapt the same to overlap and lie substantially flush, supporting means for the binding metal forming a part of the means whereby the binding metal may be bent, means for forming box material into a box body, means for feeding the box material, means for applying the bent binding metal to the box body, and means for automatically ejecting the completed boxes.

7. In a box-making machine, the combination of means for feeding a binding metal as a single strip, means for bending the binding metal lengthwise, transverse bending mechanism, cutting means for cutting the binding metal transversely, supporting means for the binding metal forming a part of the means whereby the binding metal may be bent and held about the same, means for forming box material into a box body, means for feeding the box material, means forming a part of the box forming means for carrying the boxes away from the place they are formed, and means for automatically ejecting the boxes from the carrying means and nesting the same.

8. In a box-making machine, the combination of means for supporting a binding metal as a long strip, means for feeding the binding metal and for determining the length of feed, means for bending the binding metal lengthwise, mechanism for tilting the binding metal after being bent lengthwise, means for bending the binding metal substantially the shape of the box body, cutting means for cutting the material transversely while held by part of said bending means, means for reforming one end of the separated portion of the binding metal, means forming a part of the bending means whereby the ends of the binding metal may be made to overlap, means for supporting shooks, means for removing the shooks, means for holding the shooks and for conveying them crosswise to a point adjacent to the bent binding metal, means coöperating with the shook carrying means to form the shooks into box-form, means whereby the binding metal may be forced about the edges of the box-form and crimped thereon to complete a box, means for holding the box against movement with the punch and within said carrying means, together with means for automatically ejecting the completed boxes and for stacking the same.

9. In a box-making machine, the combination of means for supporting a binding metal as a long strip, means for feeding the binding metal, means for bending the binding metal lengthwise, mechanism for tilting the binding metal after being bent lengthwise, cutting means for cutting the binding metal transversely, means for bending the binding metal substantially the shape of the box body, means for reforming the binding metal at the point of separation, means for holding body material and for conveying it to a point adjacent to the bent binding metal, means assisting to form the body material into box form, means whereby the binding metal may be crimped on the box-form to complete a box, together with means for automatically ejecting the completed boxes.

10. In a box-making machine, the combination with means for supporting a binding metal as a long strip, means for feeding the binding metal, means for bending the binding metal lengthwise, mechanism for tilting the binding metal after being bent lengthwise, means for cutting the binding metal transversely, means for bending the binding metal substantially the shape of the box body, means for reforming one end of the separated portion of the binding metal, means for forming body material into a box body, and means for applying the metal binding to the box body.

11. In a box-making machine, the combination of means for supporting a binding metal as a long strip, means for feeding the binding metal and for determining the length of feed, means for bending the binding metal lengthwise substantially V-shaped, mechanism for tilting the binding metal after being bent lengthwise, means for cutting the binding metal transversely, means for bending the binding metal substantially the shape of the box body, and means for forming body material into a box body and applying the bent binding metal thereto.

12. In a box-making machine, the combination of means for supporting a binding metal as a long strip, means for feeding the binding metal, means for bending the binding metal lengthwise, means for tilting the binding metal after being bent lengthwise, means for bending the binding metal substantially the shape of the box body as a single piece and to cause the ends to overlap, means for cutting the binding metal transversely, means for reforming the separated portion of the binding metal to cause the overlapped portions to lie substantially flush, and means for forming body material into a box body and applying the bent binding metal thereto.

13. In a box-making machine, the combination of means for supporting a binding metal as a long strip, means for feeding the binding metal, means for bending the binding metal lengthwise substantially V-shaped, mechanism for tilting the binding metal after being bent lengthwise, means for bending the binding metal as a single piece substantially the shape of the box body and to cause the ends to overlap, means for cutting the material transversely while held by a part of said bending means, means for reforming one end of the separate portion of the binding metal to cause the overlapped ends to lie substantially flush, means for conveying body material crosswise and for forming said material into a box body, means whereby the binding metal may be forced about the edges of the box body and crimped thereon to complete a box, means for removing the box from a part of the box-forming means, together with means for automatically ejecting completed boxes and for stacking the same.

14. In a box-making machine, the combination of means for supporting a binding metal as a long strip, means for feeding the binding metal, means for bending the binding metal lengthwise, means for bending the binding metal substantially the shape of the box body as a single piece and to cause the ends to overlap, means for cutting the material transversely while held by a part of said bending means, means for reforming one end of the separated portion of the binding metal to cause the overlapped ends to lie substantially flush, means for supporting and forming body material into a box body, means whereby the binding metal may be forced about the edges of the box body and crimped thereon to complete a box, means for stripping the completed box from a part of the box-forming means, together with means for automatically ejecting completed boxes and for stacking the same.

15. In a box-making machine, the combination of means for forming a box body, means for bending a metallic strip lengthwise in a continuous substantially V-shaped form, means for bending the strip to the shape of the box body, and means whereby the bent metal strip may be applied to the box body.

16. In a box-making machine, the combination of means for forming a box-body, means for bending a metallic strip lengthwise in a continuous and open folded form, means for bending the folded strip transversely, and means for applying said strip to said box body.

17. In a box-making machine, the combination of box-forming means for forming a rectangular box body, means for bending a metallic strip lengthwise in a continuous and open folded form, means for bending the folded strip transversely to the rectangular shape of a box body, and means whereby the bent strip may be applied to the box body.

18. In a box-making machine, the combination of means for forming a box body, means for bending a binding metal to adapt the same to be applied to one edge of the box body, means for reforming a part of the binding metal to adapt the ends to overlap and to lie substantially flush, and means for applying the binding metal to the box body.

19. In a box-making machine, the combination of means for forming a box body, means for bending a binding metal to adapt the same to be applied to one edge of the box body, and means for reforming a part of the binding metal to adapt the ends to overlap and to lie substantially flush.

20. In a box-making machine, the combination of means for forming a box body, means for bending a binding metal as a single strip to adapt the same to be applied to one edge of the box body, means for reforming one end of the binding metal to adapt the ends to overlap and to lie substantially flush, and means for applying the binding metal to the box.

21. In a box-making machine, the combination with means for feeding veneer, of means for forming the veneer into a box, means for feeding binding metal in long strips, means for cutting the binding metal the desired length, means for finishing the binding metal as it is being fed, together with means for bending the binding metal transversely and rectangularly and for applying the binding metal about the top edge of the box.

22. In a box-making machine, the combination with means for feeding box material, of means for forming the box material into a box, means for feeding binding metal in long strips one for each box, means for bending the binding metal to the shape of the box, and means for applying the binding metal to the box.

23. In a box-making machine, the combination with means for supporting a roll of binding metal as a long strip and for feeding the same, of means for cutting the long strip the desired length, box-forming means including forming dies for forming a rectangular box body, means for feeding the body material to said dies, means for bending the binding metal transversely and rectangularly to correspond to the shape of the box body, and means for applying and crimping the binding metal about the edges of the body material after the same has been formed into a box.

24. In a box-making machine, the combination with means for supporting a roll of metal as a long strip and for feeding the same, of means for cutting the long strip the desired length, one strip for each box, box-forming means including forming dies, together with means for bending and for applying the strip entirely around the edge of the box as a single piece after the box has been formed.

25. In a box-making machine, the combination of box-forming means, and means for bending a single metal binding strip substantially V-shaped in cross-section and rectangularly in form and for applying said strip along the entire edge of the box.

26. In a box-making machine, the combination with box-forming mechanism, of means for feeding binding metal, means for bending the binding metal lengthwise thereof, means for bending the binding metal transversely, and means for applying the binding metal to the box.

27. In a box-making machine, the combination with means for forming a substantially rectangular box from veneer, of mechanism for supporting a binding metal in a long strip, means for bending the binding metal strip and for cutting the same the desired length, and means for applying the binding metal strip so cut to the upper edge of the box on the four sides thereof and to crimp the same into locking engagement with the box.

28. In a box-making machine, the combination with means for forming a substantially rectangular box from veneer, of mechanism for supporting a binding metal in a long strip, means for bending the binding metal lengthwise and for cutting the same the desired length, means for bending the binding metal transversely, and means for applying the binding metal to the upper edge of the box on the four sides thereof.

29. In a box-making machine, the combination with forming dies, of means for feeding body material thereto crosswise, means for supporting binding metal in a long strip and for cutting the same transversely the desired length, a pair of feed rollers, a drive shaft connected to the feed rollers, a cam shaft connected to the drive shaft, a cam upon the drive shaft, means whereby the cam controls the feed rollers to feed the binding metal intermittently as desired to supply the machine, together with means for bending the binding metal lengthwise and transversely in a rectangular form and for applying the same to the upper edge of the box.

30. In a box-making machine, the combination with forming dies, of means for feeding the body material thereto crosswise and for forming the material in the shape of a box, means for supporting binding metal in a long strip and for cutting the same the desired length, a pair of feed rollers, a drive shaft connected to the feed rollers, a cam shaft connected to the drive shaft, a cam upon the drive shaft, means whereby the cam controls the feed rollers to feed the binding metal intermittently as desired to supply the machine, mechanism for bending the metal lengthwise and transversely, together with means for applying the metal to the box.

31. The combination of a rotary member carrying a plurality of dies, a reciprocatory punch, means for feeding body material crosswise to the dies, means for rotating the dies in the path of movement of the punch, means for feeding a binding metal adjacent to the movement of the punch, and means for forming the binding metal substantially V-shaped and for placing the same about the box, and means for crimping the binding metal to the box.

32. The combination of a rotary member carrying a plurality of dies, of a reciprocatory punch, pneumatic means for feeding body material crosswise to the dies, means for rotating the dies in the path of movement of the punch, means for feeding a binding metal adjacent to the movement of the punch, and means for forming the binding metal substantially V-shaped lengthwise and for applying the same about the box.

33. The combination of a rotary member carrying a plurality of dies, of a reciprocatory punch, means for feeding body material crosswise of each other in succession to the dies, means for rotating the dies in the path of movement of the punch, means for feeding a binding metal adjacent to the movement of the punch, means for bending the binding metal lengthwise and transversely thereof, and means for forming the binding metal about the box for crimping the same thereto.

34. In a box-making machine, the combination of means for supporting a binding metal in a long strip, means for feeding the strip, means for bending the strip into substantially the form it is applied to a box when made, means for reforming the binding metal, means for tilting the same, means for cutting the material the desired length to be applied to the box as a single piece, means for feeding body material including punch and die mechanism for receiving and forming the material in box shape, means for applying and for forming the single strip of metal about all sides of the box and for crimping the metal about the edge of the box, together with means for automatically discharging the box when completed.

35. In a box-making machine, the combination with means for supporting a binding metal in a long strip, means for feeding the binding metal, means for bending the binding metal lengthwise, means for cutting the binding metal the desired length to be applied to the box as a single piece, means for feeding body material including punch and die mechanism for receiving and forming the body material in box shape, and means for bending the binding metal transversely and for forcing the single strip of binding metal about all four sides of the box and for crimping said binding metal about the edge of the box.

36. In a box-making machine, the combination with means for supporting a binding metal in a long strip, means for feeding the binding metal, means for bending the binding metal lengthwise, means for cutting said binding metal the desired length to be applied to the box, means for feeding body material including punch and die mechanism for receiving and forming the material in box shape, means for bending the binding metal transversely and for forcing the single strip of binding metal about the sides of the box, together with means for automatically discharging the box when completed.

37. In a box-making machine, the combination with means for supporting a binding metal in a long strip, means for feeding the strip of binding metal, means for bending the binding metal lengthwise into substantially the form it is applied to a box when made, means for reforming the binding metal, means for cutting the binding metal the desired length to be applied to the box as a single piece, means for feeding body material including punch and die mechanism for receiving and forming the material in box shape, means for bending the material transversely and for applying the single strip of binding metal about all sides of the box, together with means for automatically discharging the box when completed.

38. In a box-making machine, the combination with means for supporting a binding metal in a long strip, means for feeding the strip of binding metal, means for bending the binding metal lengthwise, means for cutting the binding metal the desired length to be applied to the box as a single piece, means for feeding body material including punch and die mechanism for receiving and forming the material in box shape, and means for bending the binding metal transversely and for applying the single strip of metal about all sides of the box and for crimping the metal about the edge of the box.

39. In a box-making machine, the combination with means for forming a veneer body material into box shape, of a substantially rectangular clenching anvil, four bending jaws arranged to fold a binding strip about the anvil on all four sides thereof, means for feeding the strip initially in the path of two of the bending jaws, and means whereby the bent strip may be applied to the box and bound thereto.

40. In a box-making machine, the combination with means for forming a veneer body material into box shape, of a clenching anvil, a plurality of bending jaws arranged to complete the fold of a binding strip about the anvil on all sides thereof, means for feeding the strip initially in the path of the jaws, and means whereby the folded strip may be applied to the box.

41. In a box-making machine, the combination with means for feeding and forming box material into box shape, of a clenching anvil, means for feeding a single strip of binding metal adjacent to the anvil, mechanism for bending the binding metal entirely around the anvil, means whereby the ends of the binding metal may be made to overlap on one side of the anvil, and means for applying the binding metal to the box.

42. In a box-machine, the combination with means for feeding body material, means for forming said material in box shape, a clenching anvil, mechanism for bending a binding metal around the anvil, means for feeding the binding metal in a single strip, mechanism for overlapping the ends of the binding metal, and means for applying the bent binding metal upon the box body.

43. In a box-machine, the combination with means for forming body material into box shape, of an anvil, a central bending bar adapted to move to and from the anvil, a jaw at each end of the central bending bar adapted to swing against the sides of the anvil, a second pair of jaws adapted to move laterally of the line of the first pair of jaws and to swing the ends of the binding material against the remaining sides of the anvil, means for feeding the binding material to the central bending bar as a single strip, and means for applying the bent strip to the edge of the box.

44. In a box-machine, the combination with means for feeding veneer, of means for forming the veneer into box shape, an anvil, a central bending arm adapted to move to and from the anvil, means for feeding a binding strip, a jaw at each end of the central bending bar adapted to swing against the sides of the anvil, a second pair of jaws adapted to move laterally of the line of the first pair of jaws and to swing the ends of the binding strip against the remaining sides of the anvil, means for causing the ends of the binding strip to overlap on one side of the anvil, and means for applying said binding strip to the box.

45. In a box-making machine, the combination with means for forming body material into box shape, of an anvil, a central bending bar adapted to move to and from the anvil, means for feeding binding material to the central bar, a jaw at each end of the central bending bar adapted to swing against the sides of the anvil, a second pair of jaws adapted to move laterally with respect to the line of the first pair of jaws and to swing the ends of the binding material against the remaining side of the anvil, means for holding the binding material upon the anvil, together with means for applying the binding material on the box.

46. In a box-making machine, the combination with means for forming veneer into box shape, of means for supporting binding metal in the form of a long strip, means for folding the binding metal lengthwise, means for cutting the metal transversely, a rectangular anvil, means for bending the folded strip on all four sides of the anvil and overlapping its ends, mechanism for holding the binding metal upon the anvil, and mechanism for applying said binding metal to the box.

47. In a box-making machine, the combination with means for feeding veneer, means for forming the veneer into box-shape, means for feeding a single strip of binding metal adapted to be bound entirely around the box, and means for causing the ends of the binding metal to overlap and for applying the bent binding metal to the box.

48. In a box-machine, the combination with means for forming body material into box shape, of feeding means for a binding metal, means for bending the binding metal lengthwise thereof, a plurality of swinging and reciprocating jaws for bending the binding metal, and means for applying the binding metal to the box.

49. In a box-making machine, the combination with means for forming veneer into box shape, of an anvil, means for feeding and for bending a binding metal lengthwise, means for bending the binding metal around the anvil, means for holding the bent binding metal upon the anvil, and means for applying the binding metal to the box.

50. In a box-making machine, the combination of means for forming veneer into box shape, of an anvil, mechanism for feeding a binding material adjacent to the anvil, means for bending the binding material about the anvil on all four sides thereof from the center of said binding material, guides for the ends of the binding material as it swings around the anvil, mechanism for overlapping the ends of the binding material upon the anvil, means for forcing the bent binding material about the upper edge of the box for crimping the same thereto, and means for automatically discharging the completed box.

51. In a box-making machine, the combination of means for forming body material into box shape, of an avil, means for bending a long strip of binding metal lengthwise thereof, mechanism for feeding the binding metal adjacent to the anvil, a plurality of reciprocatory and swinging jaws for bending the binding material about the anvil on all sides thereof and means for forcing the bent binding metal about the upper edge of the box.

52. In a box-making machine, the combination of means for forming veneer into box form, of an anvil, means for bending a binding strip lengthwise into substantially V-shaped form, means for feeding said binding strip, a plurality of swinging jaws for forcing said binding strip around the anvil from the center thereof, mechanism for holding the binding strip upon the anvil, and means for forcing the bent binding strip about the edge of the box.

53. In a box-making machine, the combination with means for forming a box, of an anvil, means for feeding binding material adjacent to the anvil, mechanism for holding the anvil in position to receive the binding, swinging jaws for bending the binding material on the anvil from the center and leaving the binding material open at the corners to receive the body material, and means for applying the binding material to the box.

54. In a box-making machine, the combination with means for forming a box, of an anvil having projecting corners, means for feeding a binding material, swinging jaws for bending the binding material around the the anvil from the center of the binding leaving the binding material open at the corner to receive the box body material so that the binding material will extend entirely around the anvil, and means for applying the binding material to the box.

55. In a box-making machine, the combination of means for forming a continuous substantially V-shaped binding metal as a single piece and substantially the shape of the open edge of a box body and for supporting the same, and means for forming a box body and for forcing the same into the binding metal.

56. In a box-making machine, the combination with means for forming a box from box material, of a substantially rectangular anvil, mechanism for feeding a binding material in a single strip, mechanism for bringing the binding material against the anvil and bending said binding material around the first two corners of the anvil, laterally movable mechanism for bending the ends of the binding material around the two last corners of the anvil, and means for applying the binding material to the box.

57. In a box-making machine, the combination of means for feeding and bending a binding metal, means for feeding and supporting body material crosswise of each other, a die, a plate forming a bottom for said die and having yielding members and a suction device as a part of said plate, and a reciprocatory punch conforming to the shape of the box body and coöperating with the die to form said box body.

58. In a box-making machine, the combination of means for feeding and bending a binding metal, means for feeding and supporting body material, a die, a plate forming a bottom for said die and having yielding members as a part of said plate, and a punch conforming to the shape of the box body and coöperating with the die to form said body.

59. In a box-making machine, the combination of means for feeding and bending a binding metal, means for feeding and supporting body material, a die, a reciprocatory punch conforming to the shape of the box body and having sides pivotally held and adapted to coöperate with the die to form the box body, said punch having a relatively movable member adapted to engage and force the body material into the die, and means whereby the binding metal may be applied to the box body.

60. In a box-making machine, the combination of means for feeding and bending a binding metal, means for feeding and supporting body material crosswise of each other, a die, a reciprocatory punch conforming to the shape of the box body and adapted to coöperate with the die to form the box body, said punch having a relatively movable member adapted to engage and force the body material into the die, and means whereby the binding metal may be applied to the box body.

61. In a box-making machine, the combination of means for feeding and bending a binding metal, means for feeding and supporting body material crosswise of each other, a die, a reciprocatory punch conforming to the shape of the box body and adapted to coöperate with the die to form the box body, said punch having a relatively movable member adapted to engage and force the body material into the die, means whereby the binding metal may be applied to the box body, and means for stripping the completed box from the punch.

62. In a box-making machine, the combination of means for forming a binding material, a die, a plunger having two relatively movable members, one adapted to initially engage the body material and force the body material into the die and the other having yielding means to guide the edge of said body material into the binding, and means for applying the binding material to the box body.

63. In a box-making machine, the combination of means for forming a binding material, a die, a punch having two relatively movable members, one adapted to initially engage the body material and force the same into the die, means for applying the binding material to the box body, and means independent of the punch and die for stripping the completed box from the punch.

64. In a box-making machine, the combination of means for forming a binding metal, a die, a punch coöperating with the die to form body material into a box body, means for supporting the binding metal about the punch, levers pivotally supported about the punch and having clenching plates at one end thereof, means for moving said levers to cause the said levers to clench the binding metal about the box body, and means independent of the punch and die for stripping the completed box from the punch.

65. In a box-making machine, the combination of means for forming a binding metal, a die, a punch coöperating with the die to form body material into a box body, means for supporting the binding metal about the punch, vertically arranged levers pivotally supported about the punch and having clenching means, as a part thereof, and means held to a part of the punch for moving said levers to cause the said levers to clench the binding metal about the box body.

66. In a box-making machine, the combination of means for forming a binding metal, a die, a punch coöperating with the die to form body material into a box body, means for supporting the binding metal about the punch, clenching means, and means independent of the punch and die for stripping the completed box from the punch.

67. In a box-making machine, the combination of means for forming a binding metal, means for forming a box body, means for clenching the binding metal to one edge of the box body, devices located about the box-forming means adapted to engage the upper edge of the box body to strip the box free of a part of the forming means, and means for releasing said devices.

68. In a box-making machine, the combination of means for forming a binding metal, means for forming a box body, means for applying the binding metal to the box body, devices adapted to engage a part of the box to strip the same from a part of the forming means, pivoted dogs adapted to hold said devices against movement, and means for releasing the dogs.

69. In a box-making machine, the combination of a rotary carrier having a plurality of dies, a vertically movable punch, means for supporting a binding metal about the punch, means for moving the dies to successively present the same under the punch, means for placing shooks crosswise in the dies, a stationary member forming a part of the dies in succession and having yielding parts for the box body as the latter is formed, means forming a part of the punch for guiding the edges of the box body into the binding metal, and means for clenching the binding metal about the edge of the box body.

70. In a box-making machine, the combination of a rotary carrier, a die, a vertically movable punch coöperating with the die to form a box body, means for supporting a binding about the punch, means for moving the carrier under the punch, means for placing shooks crosswise in the die, yielding means for the bottom of the box body while being formed, means movably held to and forming a part of the punch for guiding the edges of the box body toward the binding, and means for applying the binding to the box body.

71. In a box-making machine, the combination of a die, a vertically movable punch, means for supporting a binding about the punch, means for placing shooks crosswise in the die, a member forming a part of the dies and having yielding parts for the box body as the latter is formed, means forming a part of the punch for guiding the edges of the box body into the binding, and means for applying the binding about the edge of the box body.

72. In a box-making machine, the combination of a bodily and laterally movable die having pivotally held side members, a member forming a bottom for said die and over which the latter is moved, said bottom having wings yieldingly held thereto, and a vertically movable punch coöperating with the die to form a box body.

73. In a box-making machine, the combination of a movable die, a stationary member forming a bottom for said die and having yielding parts, a vertically movable punch, an anvil located about said punch and movable therewith, means for supporting a binding about said anvil, and movable guide plates forming a part of said punch and adapted to guide the box body into the binding.

74. In a box-making machine, the combination of a die, a vertically movable punch, an anvil located about said punch and movable therewith, means for supporting a binding about said anvil and pivotally and yieldingly held guide plates forming sides of said punch and adapted to guide the box body to the binding.

75. In a box-making machine, the combination of a die, a vertically movable punch coöperating with the die to form a box body, an anvil located about said punch and movable therewith, means for forming and supporting a binding about said anvil, and means for applying the binding to the box body.

76. In a box-making machine, the combination of a die, a movable punch, a plate forming a bottom for the die and arranged in the path of movement of the punch, wings pivotally held to the plate to coöperate with the punch to aline the edge of the box body when formed, and springs for yieldingly forcing the wings in one direction.

77. In a box-making machine, the combination of a die, a movable punch coöperating with the die to form a box body, a plate arranged in the path of movement of the punch, wings movably held to the plate to coöperate with the punch to aline the edge of the box body when formed, and means for binding the box body.

78. In a box-making machine, the combination of a die, a punch having a point relatively movable with respect to the rest of the punch and coöperating with the die to form a box body, means tending normally to yieldingly force the point in one direction, means movable with the punch adapted to hold a binding, guide plates pivotally held to the punch and forming sides therefor, and means located about the punch for applying the binding to the box body.

79. In a box-making machine, the combination of a die, a vertically movable punch having a point relatively movable with respect to the rest of the punch and coöperating with the die to form a box body, a spring tending normally to yieldingly force the point in one direction, guide plates pivotally held as a part of the punch and forming sides therefor, and means located about the punch for holding the parts of the box body together.

80. In a box-making machine, the combination of a die, a punch coöperating with the die to form a box body, means for holding binding means about the punch, guide plates pivotally held as a part of the punch, and forming sides therefor, springs for yieldingly forcing the plates in one direction, stops for limiting the movement of the plates, and means for applying the binding to the box body.

81. In a box-making machine, the combination of a vertically movable shank, a sleeve having a limited movement on said shank, a substantially rectangular punch point having walls and having a limited movement with respect to the shank, a plurality of guide plates pivotally supported on the sleeve, means for supporting a binding adjacent to the guide plates, and means coöperating with the punch point and guide plates for forming a box body and for applying a binding thereto.

82. In a box-making machine, the combination of a vertically movable shank, a sleeve having a limited movement on said shank, a substantially rectangular punch point having walls and a stem having a limited movement within the shank, a plurality of guide plates pivotally supported and yieldingly held on the sleeve, means for supporting a binding adjacent to the plates, a die coöperating with the punch point and guide plates for forming a box body, and means for applying a binding thereto.

83. In a box-making machine, the combination of a die, means for placing shooks crosswise in the die, a punch point having vertical marginal walls, a member independent of the die and forming a bottom therefor and coöperating with the die and punch point to form a box body, yieldingly held guide plates forming a part of the punch, a support to which said guide plates are pivoted also forming a part of the punch, and means for applying a binding to the box body when formed.

84. In a box-making machine, the combination of a die, a rectangular punch point, a stem projecting from said point, a shank in which said stem has a limited movement, a spring normally forcing the shank and point in one direction, a sleeve slidingly held on said shank and having a movement independent of the movement of the punch point, guide plates pivotally held to the sleeve, an anvil supported by the sleeve and movable therewith, means for supporting a binding on the anvil, means located about the anvil and having a relative movement with respect thereto and adapted when the box body is formed to apply the binding to said body, and means for stripping the box body and holding the same in the die.

85. In a box-making machine, the combination of a die, a rectangular punch point, a stem projecting from said point, a shank in which said stem has a limited movement, a spring normally forcing the shank and point in one direction, a sleeve slidingly held on said shank and having a movement independent of the movement of the punch point, an anvil supported by the sleeve and movable therewith, means for supporting a binding on the anvil, and means located about the anvil and having a relative movement with respect thereto and adapted when the box body is formed to apply the binding to said box body.

86. In a box-making machine, the combination of a die, a punch having pivotally held plates forming guiding means and having a relatively movable point adapted to coöperate with the die to form a box body, a sleeve forming a part of the punch to which the plates are pivoted, said sleeve and the guide plates having openings, an adjustable spring seat one for each opening, a spring interposed between said adjustable seat and the guide plate, and means for applying a binding to the box body when formed.

87. In a box-making machine, the combination of a die, a punch having guides forming sides therefor and adapted to coöperate with the die to form a box body, means forming a part of the punch to which the guides are pivotally held, said means and the guides having openings therethrough, an adjustable spring seat one for each opening, a spring interposed between said adjustable seat and one of the guides, and means for limiting the pivotal movement of the guides.

88. In a box-making machine, the combination of a die, a punch having guide plates forming sides therefor and adapted to coöperate with the die to form a box body, means forming a part of the punch to which the guides are pivotally held, said means and the guides having openings, an adjustable spring seat one for each opening, a spring interposed between said adjustable seat and one of the guide plates, stop screws for limiting the movement of the guide plates, and means for applying a binding to the box body when formed.

89. In a box-making machine, the combination of a die, a punch having yielding sides coöperating with said die to form a box body, an anvil movable with the punch, means for forming a binding about said anvil and for supporting said binding on the anvil, clencher mechanism coöperating with the punch and anvil to apply the binding to the box body, and stripping mechanism independent of the punch and die.

90. In a box-making machine, the combination of a die, a punch coöperating with with said punch, springs arranged around said die to form a box body, rods movable the rods, and a plurality of adjustable stops adapted to engage the ends of the rods to limit the upward movement of the punch.

91. In a box-making machine, the combination of a die, a punch coöperating with said die to form a box body, rods movable with said punch, and a plurality of stops adapted to engage the ends of the rods to limit the upward movement of the punch.

92. In a box-making machine, the combination of means for forming a box body, means for applying a binding to said box body, a plurality of vertically movable rods, means for forcing the rods downward and for holding the same against the box body, means tending normally to force the rods upward, said means for holding the rods against the box body being adapted to be automatically released by the binding applying means to strip the box from the box-forming means.

93. In a box-making machine, the combination of means for forming a box body, means for applying a binding to said box body, a plurality of vertically movable rods adapted to engage the bound edge of the box, and means whereby the rods may be made to automatically strip the box from the punch.

94. In a box-making machine, the combination of punch and die mechanism for forming a box body, means for applying a binding to said box body, rods adapted to engage the box body for stripping the same from the punch, movable dogs adapted to hold the rods in engagement with the bound edge of the box, means tending normally to force the rods to a disengaged position, and means whereby the dogs may be automatically released by the binding applying means during the movement of the punch.

95. In a box-making machine, the combination of punch and die mechanism for forming a box body, means for applying a binding to said box body, rods adapted to engage the box body for stripping the same from the punch, pivotally held dogs adapted to hold the rods in engagement with the bound edge of the box, springs tending normally to force the rods to a disengaged position, and means whereby the dogs may be automatically released by the binding applying means during the movement of the punch.

96. In box-making machines, the combination of a carrier having a plurality of dies, means coöperating with the dies in succession in forming a box, an upwardly moving arm adapted to engage the boxes in succession and to force them from the dies above the same, and means for receiving the ejected boxes and nesting the same.

97. In a box-making machine, the combination of a carrier, means for forming boxes, a pivoted arm, means for forcing the arm through the carrier to eject the boxes one at a time, and a chute located above the carrier having a spring portion adapted to engage a part of the box and to assist in nesting the same as the boxes are ejected.

98. In a box-making machine, the combination of a carrier, means for forming boxes, a vertically movable and pivoted arm, means for forcing the arm through the carrier to eject the boxes one at a time, and a chute having vertical and horizontal portions provided with a spring portion adapted to engage a part of the box and to assist in nesting the same as the boxes are ejected.

99. In a box-machine, the combination with a series of rotary dies, of means for feeding material to the dies, a punch coöperating with the dies in succession for forming the box, an anvil movable with the punch, and means for bending a binding material about the anvil and for applying the same to the box form.

100. In a box-machine, the combination of a series of movable dies, a reciprocatory punch to coöperate with the dies in succession for forming the boxes, an anvil movable with the punch, and means for bending a binding material about the anvil and for applying the same to the box form.

101. In a box-machine, the combination with a movable die, of a reciprocatory punch, an anvil movable with the punch and the latter movable independently of said anvil, and mechanism forming clenchers movable about the anvil.

102. In a box-machine, the combination of a die, a punch, means for feeding binding metal, oscillatory and vertically arranged clenchers located about the punch, and mechanism for simultaneously moving the clenchers into operative position and for moving the punch from the ore.

103. In a box-machine, the combination with a movable die, of a punch coöperating with the die to make a form to complete the box, said punch having forming members pivoted thereto, a stationary die member forming a bottom for the die, and mechanism for operating the punch.

104. In a box-machine, the combination with a movable die, a normally fixed plate adapted to form a bottom for the die, a movable punch, mechanism for moving the punch into the die to form the box, and means for applying a binding metal as a single piece about the box.

105. In a box-machine, the combination of means for folding a single piece of binding metal lengthwise and transversely in a rectangular form, means forming a rectangular box-like body, and mechanism for guiding the edges of the body into the folded binding metal.

106. In a box-machine, the combination of means for forming a strip of metal substantially V-shaped in cross-section and bending said strip in a rectangular form, means for forming a box-like body, and mechanism for registering and forcing the ends of the body into the binding.

107. In a box-machine, the combination of a die carrier, a series of dies forming a part of the carrier, a single punch, a normally fixed plate forming a bottom part for the dies only as they are successively brought into position to coöperate with the punch and over the plate, and an intermittent gear combination for operating the dies step by step.

108. In a box-machine, the combination of a series of dies, mechanism for operating the dies step by step, spring fingers carried by the dies for receiving and holding the body material, a plate forming a bottom for each die as it is brought over said plate, together with a single reciprocatory device coöperating with the dies in succession to form the boxes.

109. In a box-machine, a die mechanism for forming the box, an anvil for forming a binding material to fit the box, said anvil being movable with a part of the die mechanism, mechanism for placing the binding material in a single piece upon the anvil in position to be supplied to the box, mechanism for placing the body material in the die, mechanism for forming the box in the die, and mechanism for applying the binding material to the edge of the box.

110. In a box-machine, a die for forming the box, a movable anvil for forming a binding material, mechanism for placing the binding material upon the anvil ready to be applied to the box, mechanism for placing the body material in the die, mechanism for forming the body material in the die, mechanism for applying the binding material to the edges of the body material, and mechanism movable with the anvil for clenching the binding material upon the body material.

111. In a box-machine, a die for forming the box, a movable anvil for forming a binding material to fit the box, mechanism for placing the binding material upon the anvil and holding it ready to be applied to the box, mechanism for placing the body material in the die and forming it ready to receive the binding material, and mechanism movable with the anvil for applying the binding material to the box and clenching it.

112. In a box-machine, a horizontally movable die for forming the box, an anvil for forming the binding material to fit the box, mechanism for placing the body material in the die, mechanism for forming the body material into a box within the die, mechanism for applying the binding material to the box, mechanism for holding the box in the die while the forming mechanism is withdrawn, and means for moving the die with the finished box away from said box forming mechanism.

113. In a box-machine, a die, a movable anvil, mechanism for placing the body material in the die, a punch with which the anvil moves for forming the box, mechanism for placing a binding material upon the anvil, mechanism for applying the binding material to the box, and mechanism for stripping the box from the punch.

114. In a box-machine, a die, mechanism for placing the body material in the die, a punch for forming the box, an anvil movable with the punch, mechanism for placing a binding material upon the anvil, and mechanism for guiding the edges of the body material into the binding material.

115. In a box-machine, a die, mechanism for placing the body material in the die, a punch for forming the box, an anvil, mechanism for placing the binding material upon the anvil, mechanism for guiding the edges of the body material into the binding material, and mechanism movable with the punch for clenching the binding material upon the body material.

116. In a box-machine, a die, mechanism for placing the body material in the die, a punch for forming the box, an anvil, mechanism for placing a binding material upon the anvil, mechanism for guiding the edges of the box into the binding material, and mechanism movable with the punch for registering the edges of the box in said binding material.

117. In a box-machine, a die, mechanism for placing the body material in the die, a punch for forming the box, an anvil, mechanism for placing a binding material upon the anvil, mechanism for guiding the edges of the box into the binding material, mechanism for registering the edges of the box in the binding material, and mechanism movable with the punch for clenching the binding material upon the box.

118. In a box-machine, the combination with a punch, of a die coöperating with the punch to form a box body, means for forming and supporting a binding metal around the punch, means for applying and crimping the binding metal about the box body, and mechanism coöperating with the punch and controlled by its movement for stripping the box from the punch.

119. In a box-machine, the combination with box-forming mechanism including a die and punch movable independently, mechanism for holding the box in the die while the punch is withdrawn, means for moving the die with the finished box out of the path of movement of the punch, and means for forming and applying a binding metal as a single piece about the box form.

120. In a box-machine, the combination with box-forming mechanism including a die and punch movable independently of each other, means for forming and supporting a binding metal around the punch, means for applying and crimping the binding metal about the box form, and mechanism coöperating and movable with the punch for stripping the box from the punch and for holding the box in the die while the punch is withdrawn.

121. In a box-machine, a series of dies operated step by step, mechanism for placing the body material in the dies, mechanism coöperating with the dies in succession for forming the box, mechanism for forming a substantially V-shaped binding, mechanism for bending and placing the binding upon the edges of the box, and mechanism for discharging the completed boxes from the dies.

122. In a box-machine, mechanism for producing the box-body, mechanism for feeding and measuring a binding metal from a stock, transverse cutting mechanism, lengthwise bending means, transverse bending means for bending the binding metal rectangularly, and means for placing the binding metal upon the box body.

123. In a box-machine, mechanism for producing the box body, mechanism for feeding the binding metal in a single piece from a stock, transverse cutting means, and means for bending the binding metal rectangularly to cause the ends to overlap and for placing the binding metal upon the box body.

124. In a box-machine, mechanism for producing a box body, variable feed mechanism for feeding a binding metal from a stock, lengthwise bending means, transverse cutting means, and means for bending the binding metal in a rectangular form and for placing the binding metal upon the box body.

125. In a box-machine, mechanism for producing a box body from two shooks laid crosswise, mechanism for feeding a determined length of binding metal from a stock, means for bending the metal lengthwise and substantially V-shaped, transverse cutting means, means for bending the binding metal transversely to a rectangular form, and means for placing the binding metal upon the box body.

126. In a box-machine, mechanism for producing the box body from two shooks laid crosswise, mechanism for feeding and measuring a binding metal in a single piece from a stock, means for bending the binding metal lengthwise, transverse cutting means, means for bending the binding metal transversely, and means for placing the binding metal upon the box body.

127. In a box-machine, mechanism for producing the box body, said box body comprising two shooks laid cross-wise and having their ends turned up and there being openings at the corners, mechanism for feeding and measuring a binding metal from a stock, means for bending the binding metal lengthwise substantially V-shaped, transverse cutting means, means for bending the binding metal transversely rectangular in form, and means for placing the binding metal upon the box body.

128. In a box-machine, mechanism for producing a box body, mechanism for feeding the binding metal, mechanism for bending the binding metal lengthwise, mechanism for bending the binding metal transversely, and mechanism for placing the binding metal upon the box body.

129. In a box-machine, mechanism for producing a box body, mechanism for feeding the binding metal, mechanism for centering the binding metal, mechanism for folding the binding metal lengthwise, mechanism for feeding a determined length of the folded binding metal, and mechanism for placing the binding upon the box body.

130. In a box-machine, mechanism for producing the box body, mechanism for feeding the binding metal from a stock, mechanism for folding the binding metal lengthwise, mechanism for feeding and measuring a determined length of the binding metal from the folded binding metal, mechanism for cutting the measured binding metal, mechanism for reforming one end of the cut binding metal, and mechanism for placing the binding metal upon the box body so that the ends overlap.

131. In a box-machine, mechanism for producing a box body, mechanism for feeding the binding metal from a stock, mechanism for folding the binding metal lengthwise, mechanism for feeding and measuring the binding metal from the folded binding metal, mechanism for tilting the binding, mechanism for cutting the binding metal, mechanism for reforming one end of the cut binding metal, and mechanism for placing the binding metal upon the box body.

In testimony whereof, I have hereunto set my hand at Los Angeles, California, this 19th day of December 1908.

CHARLES BURNHAM.

In presence of—
JAMES R. TOWNSEND,
M. BEULAH TOWNSEND.

It is hereby certified that in Letters Patent No. 1,119,343, granted December 1, 1914, upon the application of Charles Burnham, of Los Angeles, California, for an improvement in "Box-Machines," errors appear in the printed specification requiring correction as follows: Page 24, line 34, for the word "avil" read *anvil;* page 27, transpose lines 70 and 71; page 28, line 50, for the word "ore" read *die;* and that the said Letters Patent should be read with these corrections therein that the same may conform to the record of the case in the Patent Office.

Signed and sealed this 23rd day of March, A. D., 1915.

[SEAL.]

J. T. NEWTON,
*Acting Commissioner of Patents.*